(12) United States Patent
Park et al.

(10) Patent No.: US 11,245,264 B2
(45) Date of Patent: Feb. 8, 2022

(54) POWER CONVERTING APPARATUS, PHOTOVOLTAIC MODULE, AND PHOTOVOLTAIC SYSTEM INCLUDING THE SAME

(71) Applicant: LG ELECTRONICS INC., Seoul (KR)

(72) Inventors: Moonho Park, Seoul (KR); Youngchan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 80 days.

(21) Appl. No.: 16/685,857

(22) Filed: Nov. 15, 2019

(65) Prior Publication Data
US 2020/0161868 A1 May 21, 2020

(30) Foreign Application Priority Data

Nov. 16, 2018 (KR) .................. 10-2018-0141801

(51) Int. Cl.
*H02M 7/5387* (2007.01)
*H02M 1/42* (2007.01)
*H02J 3/38* (2006.01)

(52) U.S. Cl.
CPC .......... *H02J 3/385* (2013.01); *H02M 7/53871* (2013.01); *H02J 3/388* (2020.01)

(58) Field of Classification Search
CPC .......... H02J 3/16; H02J 3/388; H02J 2300/24; H02J 3/381; H02J 3/385; Y02E 40/30; Y02E 10/56; H02M 7/53871
See application file for complete search history.

(56) References Cited

U.S. PATENT DOCUMENTS

| 9,991,819 B2 | 6/2018 | Hatakeyama et al. | |
| 2009/0141522 A1* | 6/2009 | Adest | H02H 7/1227 363/55 |
| 2013/0077367 A1* | 3/2013 | Zhu | H02J 3/16 363/97 |
| 2015/0188454 A1 | 7/2015 | Noritake et al. | |
| 2017/0018932 A1* | 1/2017 | Pahlevaninezhad | H02J 3/382 |
| 2017/0025859 A1* | 1/2017 | Garcia | H02J 3/38 |
| 2017/0054301 A1* | 2/2017 | Fintzos | H02J 3/381 |
| 2017/0214337 A1* | 7/2017 | Baronian | H02J 3/385 |
| 2017/0269168 A1* | 9/2017 | Lung | H02J 3/50 |
| 2018/0248376 A1* | 8/2018 | Teramoto | H02J 7/0014 |

FOREIGN PATENT DOCUMENTS

WO WO 2015/163735 A1 9/2018

* cited by examiner

*Primary Examiner* — Jared Fureman
*Assistant Examiner* — Esayas G Yeshaw
(74) *Attorney, Agent, or Firm* — Birch, Stewart, Kolasch & Birch, LLP

(57) ABSTRACT

Discussed are a power converting apparatus, a photovoltaic module, and a photovoltaic system including the photovoltaic module and the power converting apparatus. The power converting apparatus is capable of converting direct current (DC) power from the solar cell module into alternating current (AC) power, outputting the AC power to a grid, and detecting a signal indicative of abnormality in grid power caused by power cut or the like, thereby preventing an islanding operation.

19 Claims, 15 Drawing Sheets

POWER CONVERTING APPARATUS, PHOTOVOLTAIC MODULE, AND PHOTOVOLTAIC SYSTEM INCLUDING THE SAME

CROSS-REFERENCE TO RELATED APPLICATION

This application claims the priority benefit of Korean Patent Application No. 10-2018-0141801, filed on Nov. 16, 2018 in the Korean Intellectual Property Office, the disclosure of which is incorporated herein by reference in its entirety.

BACKGROUND OF THE INVENTION

1. Field of the Invention

The present invention relates to a power converting apparatus, a photovoltaic module, and a photovoltaic system including the same, and more particularly to a power converting apparatus, a photovoltaic module, and a photovoltaic system including the same, the power converting apparatus capable of preventing islanding operation when connected to a commercial power grid, thereby enabled to output stable alternating current (AC) power to a grid.

2. Description of the Related Art

A photovoltaic module includes a plurality of solar cells, and the solar cells may be connected in series or in parallel.

A power converting apparatus of the photovoltaic module converts direct current (DC) power into AC power.

In the case where power is supplied as AC power from a distributed power source such as the photovoltaic module is connected, when the grid is shut down for an accident or a safety issue, the power converting apparatus may not be able to detect the shot-down immediately and may keep supplying power to the grid, which can cause unstable power quality and a safety-related accident such as an electric shock. In order to prevent islanding operation, a technology for detecting the islanding operation is essentially required for the power converting apparatus.

Meanwhile, in order to detect islanding operation, a method for detecting the islanding operation by varying active power output from a power converting apparatus is used. In this case, however, a maximum power point changes, reducing efficiency of output power. In addition, if a plurality of power converting apparatuses is connected in parallel, the plurality of power converting apparatuses can affect each other and thereby degrade performance of detecting islanding operation, and, as a result, islanding operation can occur.

SUMMARY OF THE INVENTION

An object of the present invention is to provide a power converting apparatus, a photovoltaic module, and a photovoltaic system including the same, the power converting apparatus which is capable of converting an output from a solar cell module into AC power.

Another object of the present invention is to provide a power converting apparatus, a photovoltaic module, and a photovoltaic system including the same, the power converting apparatus which is capable of preventing islanding operation.

Yet another object of the present invention is to provide a power converting apparatus, a photovoltaic module, and a photovoltaic system including the same, the power converting apparatus which is capable of outputting stable AC power to a grid.

Yet another object of the present invention is to provide a power converting apparatus, a photovoltaic module, and a photovoltaic system including the same, the power converting apparatus which is capable of preventing islanding operation of the power converting apparatus using an algorithm in an inverter of the power converting apparatus.

Yet another object of the present invention is to provide a power converting apparatus, a photovoltaic module, and a photovoltaic system including the same, the power converting apparatus which is capable of stopping operation when an unstable AC voltage is output in a state in which there is no variation of output power Yet another object of the present invention is to provide a power converting apparatus, a photovoltaic module, and a photovoltaic system including the same, the power converting apparatus which is capable of supplying reactive power to a different power converting apparatus connected in parallel thereto so as to detect islanding operation occurring when there is no variation of output power and stop operation of an inverter.

In order to achieve the aforementioned objects, there are provided a power converting apparatus, a photovoltaic module, and a photovoltaic system including the same, and the power converting apparatus for converting direct current (DC) power input from a solar cell module into alternating current (AC) power and outputting the AC includes: an inverter configured to convert DC power input from the solar cell module or a converter into AC power and output the AC power to a grid; and an islanding operation detector configured to detect islanding operation of the inverter and disconnect the inverter from a grid.

The islanding operation detector can be further configured to: perform frequency detection to detect a grid frequency; selectively inject reactive power according to a variation in the detected frequency; when the variation in the grid frequency after injection of reactive power is less than or equal to a preset value, perform control to continue normal operation of the inverter; and, when the variation in the grid frequency after injection of reactive power is greater than the preset value, determine an islanding operation state and stop operation of the inverter such that the inverter is disconnected from the grid.

The detection of the frequency can be performed by tracking a grid frequency through a Phase Locked Loop (PLL) of the power converting apparatus.

An output from an inverter is supplied in the form of a sinusoidal waveform having the same phase and frequency as those of the grid and in sync with the grid. To this end, a PLL is used to detect phase information of the grid.

Thus, based on a variation in a grid frequency detected by the PLL, whether there is an error in the grid frequency is determined primarily. A frequency variation Err in the grid frequency can be calculated from a difference between a previous grid frequency and a current grid frequency, and, if the frequency variation is greater than or equal to a predetermined value, it is controlled such that reactive power is injected to an output voltage of the inverter.

In this case, the process of calculating a frequency variation based on a phase angle detected by the PLL can be performed independently by individual PLLs of inverters connected in parallel to one another, as shown in the present invention.

In this case, a fractional number of a PLL is calculated differently by each inverter and thus the same fractional number is less likely to be obtained. That is, the respective inverters connected in parallel to one another are hardly likely to obtain the same value of Err, and thus each inverter applies independent and async reactive power. Accordingly, reactive power applied to the inverters connected in parallel can be offset by one another, thereby eliminating a possibility of a failure to detect islanding operation.

Meanwhile, if there is no frequency variation (Err=0), a normal state be determined and thus reactive power is not injected. If there is a frequency variation, reactive power is injected so as to determine whether islanding operation has occurred. In this case, an amount of leading reactive power or lagging reactive power to inject is determined based on the frequency variation.

For example, if Err=1, a first amount of leading reactive power is injected; if Err>1, a second leading reactive power is injected; if Err=−1, a first amount of lagging reactive power is injected; and, if Err<−1, a second amount of reactive power is injected. In this case, the greater the variation is, the more the reactive power is injected.

Meanwhile, in the case where the grid is connected, the power converting apparatus can be controlled by a grid frequency of a grid power source and hence there is no variation in the grid frequency even when reactive power corresponding to an insignificant amount of variation is applied from the outside. However, if reactive power is injected when grid power is not present, a greater frequency variation can be detected by a PLL. Accordingly, a variation Grid Err in a grid frequency can be calculated after injection of reactive power, and whether islanding operation has occurred can be determined based on the variation Grid Err.

Meanwhile, islanding operation need not be determined right after the detected variation Grid Err in the grid frequency is calculated to be greater than or equal to a reference value. Instead, islanding operation can be determined when the detected variation Grid Err in the grid frequency is calculated repeatedly in a predetermined period to be greater than or equal to a reference value.

To this end, if the variation Grid Err calculated after injection of reactive power is greater than or equal to the reference value, the variation can be counted and the process goes back to the grid frequency detecting step to repeatedly determine whether islanding operation has occurred.

In the case where grid power is not present, if the PLL operation is performed repeatedly, a frequency difference compared to the grid voltage frequency after primary injection of reactive power can become greater. Then, a value of Err is increased and thus greater reactive power is applied, and therefore, a frequency variation after the secondary injection of the reactive power can become greater than or equal to a reference value again. However, in the case of a temporary frequency variation, a grid signal can become stabilized again and the value of Err is reduced, and therefore, the frequency variation can become less than or equal to the reference value.

In order to determine an islanding operation state caused by power cut, not by a temporary variation, if the number of periods in which a reference value or higher is counted is greater than or equal to a preset value within a preset period of time, islanding operation can be determined and accordingly an inverter is stopped. In the present embodiment, the corresponding operation can be performed repeatedly for 10 periods, and, if three or more abnormal periods in which the reference value or higher is counted are detected, an islanding operation can be determined, and, if not, normal operation can be determined.

Meanwhile, the present invention is applied to a distributed power device in which a plurality of inverters is connected in parallel with a grid, and, in this case, the first period need not overlap with a first period of another power converting apparatus connected in parallel thereto.

Meanwhile, in the case of injecting reactive power, the reactive power can be randomly injected into output AC power of the inverter.

Meanwhile, the injected reactive power can be different from reactive power injected by another power converting apparatus connected in parallel.

Meanwhile, the controller can calculate a first frequency variation corresponding to a difference between a frequency of a current output voltage and a frequency of a previous output voltage, and randomly injects reactive power based on the first frequency variation.

Meanwhile, the controller can calculate a first frequency variation corresponding to a difference between a frequency of a current grid voltage and a frequency of a previous grid voltage, and not inject reactive power based on whether the first frequency variation is less than or equal to a reference value.

Meanwhile, after reaction power is injected randomly, the controller can perform control to turn off the inverter based on whether a second frequency variation corresponding to a difference between a frequency of a grid voltage after the injection of the reactive power and a frequency of a grid voltage before the injection of the reactive power is greater than or equal to the preset value.

Meanwhile, after reactive power is randomly injected, the controller can perform control to turn off the inverter based on whether a second frequency variation corresponding to a difference between a frequency of a grid voltage after the injection of the reactive power and a frequency of a grid voltage before the injection of the reactive power is greater than or equal to the preset value, and whether the second frequency variation is calculated a predetermined number of times or more to be greater than or equal to the preset value.

Meanwhile, the controller can perform control to inject reactive power into an output voltage based on whether the inverter restarts after a turn-off state.

Meanwhile, when a frequency of a current grid voltage and a frequency of a previous grid voltage is less than the preset value after reaction power is injected randomly, the controller can determine normal operation and keep operating the inverter.

Meanwhile, the controller can perform control to maintain output power at a constant level or within a predetermined range based on the constant level during a first period, when the inverter operates.

Meanwhile, the controller can perform control to maintain output power at a constant level or within a predetermined range based on the constant level during a first period and a second period, when the inverter operates.

In order to achieve the aforementioned objects, an embodiment of the present invention provides a power converting apparatus, a photovoltaic module, and a photovoltaic system including the same, and the power converting apparatus includes a plurality of inverters having a plurality of switching elements and converting DC power from a converter into AC power are connected in parallel with each other, wherein each of the inverters includes: a controller for controlling a corresponding inverter; and an islanding operation detector for stopping the corresponding inverter as an islanding operation is detected by injecting reactive power according to a variation of a grid frequency.

The power converting apparatus can further include an islanding operation detector configured to: calculate a first frequency variation of an AC voltage output from an inverter; selectively inject reactive power based on the first frequency variation; and, when a second frequency variation of a grid voltage after the injection of the reactive power is greater than or equal to a preset value, perform control to turn off the inverters.

Meanwhile, the islanding operation detector can change a level of the injected reactive power based on the calculated first frequency variation.

Meanwhile, the islanding operation detector can change a level of the injected reactive power during a first period.

Meanwhile, the first period can be determined randomly.

Meanwhile, the first period need not overlap with a first period of an adjacent power converting apparatus.

Meanwhile, the islanding operation detector can inject reactive power randomly.

Meanwhile, the injected reactive power can be different from reactive power injected by an adjacent power converting apparatus.

Meanwhile, the islanding operation detector can calculate a first frequency variation corresponding to a difference between a frequency of a current output voltage and a frequency of a previous output voltage, and randomly inject reactive power based on the first frequency variation.

Meanwhile, the islanding operation detector can calculate a first frequency variation corresponding to a difference between a frequency of a current output voltage and a frequency of a previous output voltage, and, when the first frequency variation is less than or equal to a reference value, not inject reactive power.

Meanwhile, after the reactive power is injected, the islanding operation detector can perform control to turn off the inverter when a second frequency variation corresponding to a difference between a grid voltage frequency after the injection of the reactive power and a grid voltage frequency before the injection of the reactive power is greater than or equal to a preset value.

Meanwhile, after reactive power is randomly injected, the islanding operation detector can perform control to turn off the inverter when a second frequency variation corresponding to a difference between a frequency of a grid voltage after the injection of the reactive power and a frequency of a grid voltage before the injection of the reactive power is greater than or equal to the preset value and when the second frequency variation is calculated a predetermined number of times or more to be greater than or equal to the preset value.

Meanwhile, when the inverter restarts operation after a turned-off state, the islanding operation detector can perform control to inject reactive power into an output voltage.

Meanwhile, after reactive power is randomly injected, the islanding operation detector can perform control to terminate injecting the reactive power and to output an AC voltage without reactive power injected based on whether a second frequency variation corresponding to a difference between a frequency of a grid voltage after the injection of the reactive power and a frequency of a grid voltage before the injection of the reactive power is less than the preset value.

Meanwhile, the islanding operation detector can perform control to maintain output power at a constant level or within a predetermined range based on the constant level during a first period based on whether the inverter operates.

Meanwhile, the islanding operation detector can perform control to maintain output power at a constant level or within a predetermined range based on the constant level during a first period and a second period based on whether the inverter operates.

Meanwhile, the power converting apparatus, the photovoltaic module, and the photovoltaic system can further include: a converter configured to convert a level of the DC power input from the solar cell module and output the DC power with the converted level; and a voltage detector configured to detect a voltage output from the inverter.

Meanwhile, the power converting apparatus, the photovoltaic module, and the photovoltaic system can further include a communication unit configured to receive grid voltage information of the grid.

According to embodiments of the present invention, there are provided a power converting apparatus, a photovoltaic module, and a photovoltaic system including the same, and the power converting apparatus for converting direct current (DC) power input from a solar cell module into alternating current (AC) power and outputting the AC includes: an inverter configured to convert DC power input from the solar cell module or a converter into AC power and output the AC power to a grid; and an islanding operation detector configured to calculate a first frequency variation of the AC power output from the inverter, selectively inject reactive power of the solar cell module based on the first frequency variation, and perform control to turn off the inverter based on whether a second frequency variation of a grid voltage of the grid after the injection of the reactive power of the solar cell module is greater than or equal to a preset value. Accordingly, it is possible to output a stable AC voltage to the grid. In particular, it is possible to stop operation in the case where there is no variation in output power in response to injection of reactive power as the grid is connected properly and in the case where an unstable AC voltage is output as the grid is disconnected. That is, it is possible to prevent islanding operation of the power converting apparatus. Therefore, the grid can be stabilized.

Meanwhile, the islanding operation detector can inject reactive power to each inverter connected in parallel for a random first period, detect an islanding operation state according to a frequency variation between a current grid frequency and a previous grid frequency, and stop operation of the inverter in response to the detection of the islanding operation state so as to disconnect output from the inverter from the grid.

Accordingly, a state in which there is no variation of a grid frequency due to injection of reactive power as the grid is connected properly can be determined as a normal operation, and a state in which there is a great variation of the grid frequency due to random injection of reactive power is determined as an abnormal state, such as disconnection of a grid power source, and therefore operation can be stopped. That is, it is possible to prevent islanding operation of the power converting apparatus.

Meanwhile, the first period is determined randomly and does not overlap with a first period of an adjacent power converting apparatus. Thus, it is possible to detect islanding operation, without affecting other inverters connected in parallel.

Meanwhile, the controller injects reactive power randomly. Thus, a maximum power point need not change and degradation of efficiency of output power can be prevented.

Meanwhile, the injected reactive power is different from reactive power injected by an adjacent power converting apparatus. Thus, a maximum power point need not change and degradation of efficiency of output power can be prevented.

Meanwhile, the controller can calculate a first frequency variation Err corresponding a difference in grid frequencies by comparing a current value and a previous value of grid frequencies continuously detected by a grid frequency detector, and, when the first frequency variation is greater than or equal to a reference value, inject reactive power randomly. Accordingly, degradation of efficiency of output power can be prevented.

Meanwhile, when the first frequency variation is less than the reference value, the controller does not inject reactive power. Accordingly, a stable AC voltage can be output to the grid.

Meanwhile, after reactive power is injected randomly, the controller calculate a second frequency variation corresponding to a difference between a frequency of current grid voltage after the injection of the reactive power and a frequency of a previous grid voltage before the injection of the reactive power, and, when the second frequency variation is greater than or equal to a preset value, perform control to turn off the inverter. Accordingly, it is possible to prevent islanding operation of the power converting apparatus.

Meanwhile, after reactive power is randomly injected, when a second frequency variation corresponding to a difference between a frequency of a current grid voltage after the injection of the reactive power and a frequency of a previous grid voltage before the injection of the reactive power is greater than or equal to the preset value and when the second frequency variation is calculated a predetermined number of times or more to be greater than or equal to the preset value, the controller can determine that a grid voltage is not present and perform control to turn off the inverter. Accordingly, it is possible to prevent islanding operation.

In particular, signals from inverters connected in parallel interact with each other and thereby it is possible to prevent that islanding operation fails to be detected and an unstable AC voltage is output to the grid even in the case where the grid is actually disconnected. Accordingly, it is possible to stabilize the grid and prevent a safety-related accident.

Meanwhile, when the inverter restarts after a turned-off state, the controller can perform control to inject reactive power into an output voltage. Accordingly, it is possible to prevent degradation of efficiency of output power.

Meanwhile, after reactive power is injected, when a frequency variation corresponding a difference between a previous value and a current value of a grid frequency is less than a preset value, the controller can determine a normal operation and continues operating the inverter, thereby outputting a stable AC voltage to the grid.

Meanwhile, the controller performs control to maintain output power at a constant level or within a predetermined range based on the constant level during a first period, when the inverter operates. That is, since variation is given not to active power but to reactive power, magnitude of the active power is equal and a waveform thereof is maintained stably, thereby preventing degradation of efficiency of output power.

Meanwhile, the controller performs control to maintain output power at a constant level or within a predetermined range based on the constant level during the first period and a second period, when the inverter operates. Accordingly, it is possible to prevent degradation of efficiency of output power.

Meanwhile, another embodiment of the present invention provides a power converting apparatus and a photovoltaic module including the same, and the power converting apparatus includes: a inverter having a plurality of switching elements and configured to convert DC power from a converter into AC power; and a controller configured to control the inverter, detect a grid frequency, and inject reactive power to an output voltage, wherein, when the inverter operates, the controller injects reactive power to an output voltage in async with another power converting apparatus connected in parallel, and, when a variation between a frequency of a current grid voltage after the injection of the reactive power and a frequency of a previous grid voltage before the injection of the reactive power is greater than or equal to a present value, the controller turns off the inverter. Accordingly, it is possible to output a stable AC voltage to the grid.

In particular, even when reactive power is injected, a frequency variation does not occur since interaction with another inverter connected in parallel is performed. Accordingly, it is possible to prevent outputting of an unstable AC voltage and stop the inverter. That is, if the above method is applied, it is possible to prevent islanding operation of multiple power converting apparatuses connected in parallel. Therefore, the grid can be stabilized.

A power converting apparatus and a photovoltaic module according to an embodiment of the present invention includes: an inverter having a plurality of switching elements and converting DC power from a converter into AC power; and a controller configured to control the inverter and inject reactive power to the AC power, wherein the controller is configured to inject reactive power for a random first period, detect an islanding operation state according to a frequency variation between a first grid frequency and a previous grid frequency collected by the gate way, and stop operation of the inverter in response to the detection of the islanding operation state so as to disconnect the inverter from the grid.

BRIEF DESCRIPTION OF THE DRAWINGS

The embodiments will be described in detail with reference to the following drawings in which like reference numerals refer to like elements wherein.

DETAILED DESCRIPTION OF THE EMBODIMENTS

The present invention proposes a method for reducing ripples in current input to a converter in a photovoltaic module.

Hereinafter, the present invention will be described in more detail with reference to the accompanying drawings.

The suffixes "module" and "unit" of elements herein are used for convenience of description and need not have any distinguishable meanings or functions. Accordingly, the suffixes "module" and "unit" can be used interchangeably.

Figure 1A:
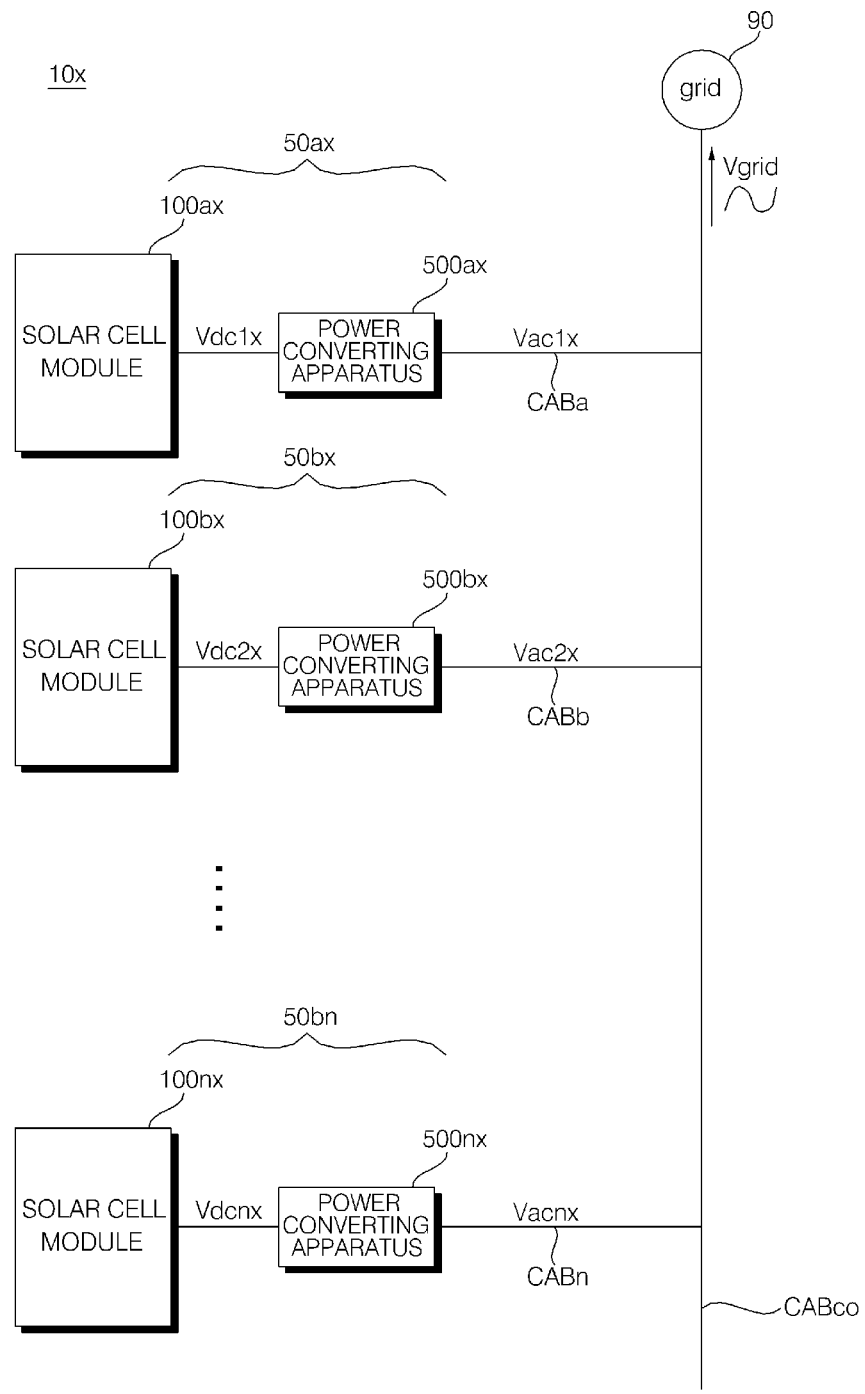
FIG. 1A is a diagram showing a photovoltaic system including a photovoltaic module to which a conventional islanding operation preventing technology is applied.
Figure 1B:
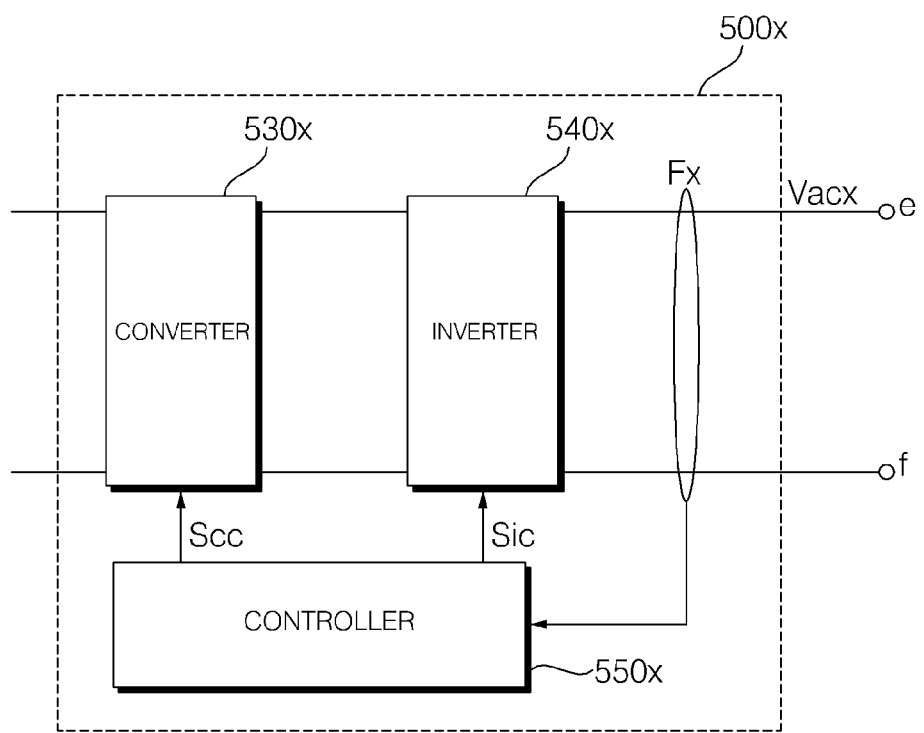
FIGS. 1B to 1D are diagrams referred to in the description of the photovoltaic module shown in FIG. 1A.
Figure 1C:
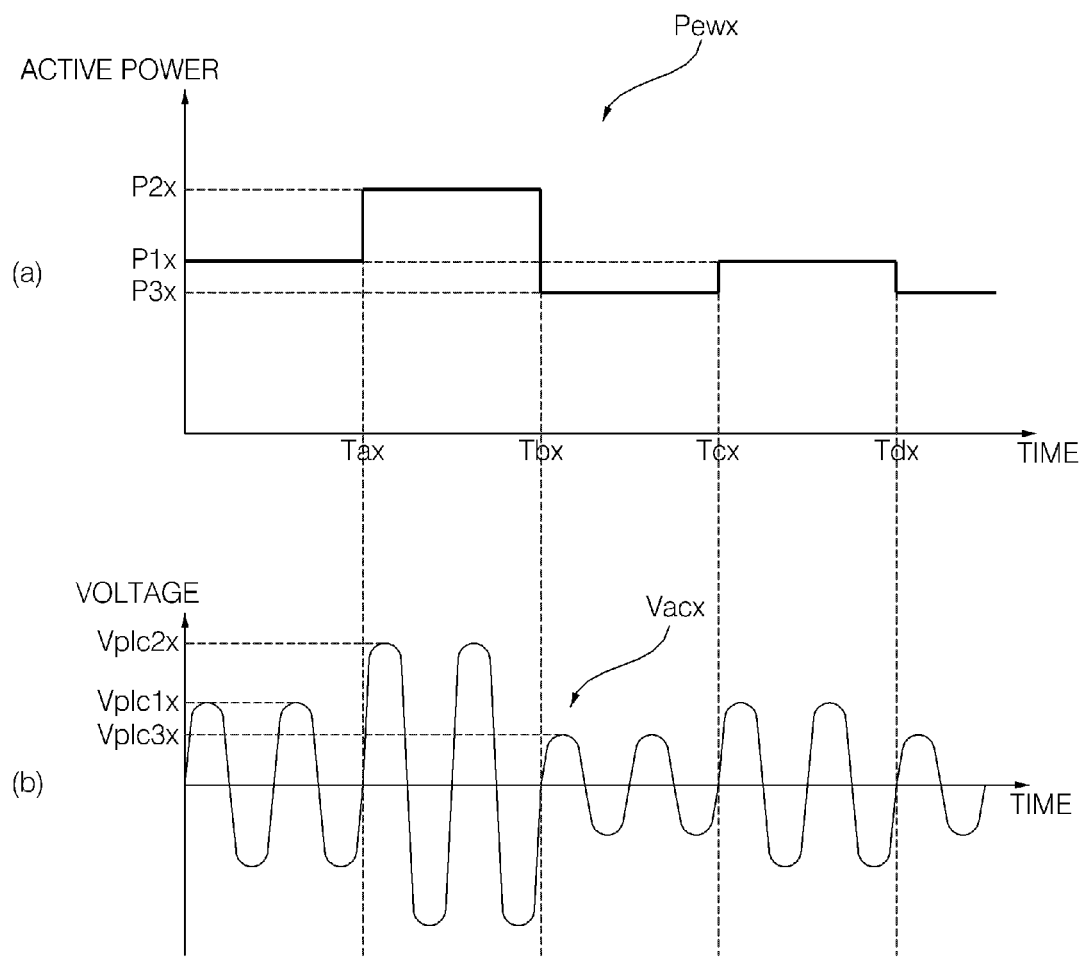
Figure 1D:
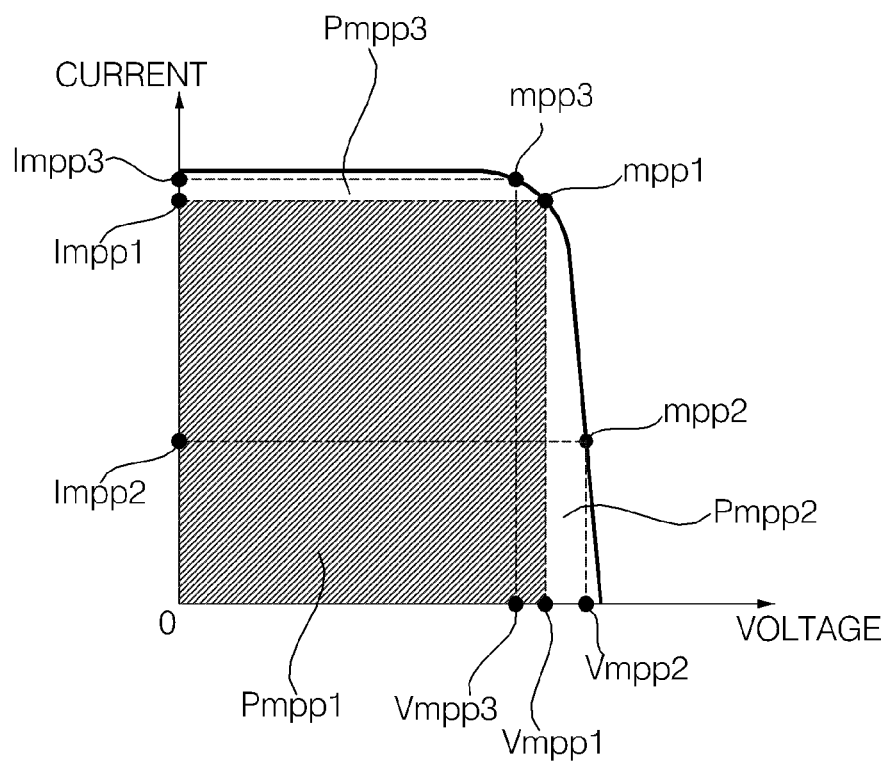

FIG. 1A is a diagram showing a photovoltaic system including a photovoltaic module to which a conventional islanding operation preventing technology is applied, and FIGS. 1B to 1D are diagrams referred to in the description of the photovoltaic module shown in FIG. 1A.

First, referring to FIG. 1, a photovoltaic system 10x can include a plurality of photovoltaic modules 50ax, 50bx, . . . , 50nx.

The plurality of photovoltaic modules 50ax, 50bx, . . . , 50nx can be connected in parallel with each other, and AC voltages Vac1x, Vac2x, . . . , Vacnx output respectively from the plurality of photovoltaic modules 50ax, 50bx, . . . , 50nx can be supplied to a grid 90 through a cable CABco.

The plurality of photovoltaic modules 50ax, 50bx, . . . , 50nx can respectively include solar cell modules 100ax, 100bx, . . . , 100nx for outputting DC voltages Vdc1x, Vdc2x, . . . , Vdcnx, and power converting apparatuses 500ax, 500bx, . . . , 500nx for outputting AC voltages Vac1x, Vac2x, . . . , Vacnx.

The plurality of photovoltaic modules 50ax, 50bx, . . . , 50nx in the photovoltaic system 10x shown in FIG. 1A is a grid-connected photovoltaic module connected to the grid 90.

In particular, the plurality of power converting apparatuses 500ax, 500bx, . . . , 500nx output the AC voltages Vac1x, Vac2x, . . . , Vacnx, respectively.

Each of the plurality of power converting apparatuses 500ax, 500bx, . . . , 500nx is controlled according to a frequency or phase of a grid voltage, and provides a stable signal to the grid accordingly. If the grid voltage is cut due to a power-cut or accident in the grid, a level, phase, or frequency of an output from each of the plurality of power converting apparatuses 500ax, 500bx, . . . , 500nx ripples, and, in islanding operation in which an unstable signal is constantly provided to the grid, a safety-related accident such as electric shock can occur. In order to solve this problem, an islanding operation preventing technology for detecting a power cut in grid to stop operation of a power converting apparatus is needed.

In particular, in the case where the plurality of power converting apparatuses 500ax, 500bx, . . . , 500nx is connected in parallel with each other and respectively outputs different AC voltages Vac1x, Vac2x, . . . , Vacnx, if an error occurs in the grid, there is a high possibility that a signal from another power converting apparatus can be recognized as a grid voltage and that an unstable output for synchronization with frequency and phase of the signal can be constantly supplied as the grid voltage.

For this reason, preventing islanding operation of the plurality of power converting apparatuses 500ax, 500bx, . . . , 500nx is important.

Meanwhile, there is a conventional islanding operation preventing method that gives a small variation to active power of AC voltages output from the plurality of power converting apparatuses 500ax, 500bx, . . . , 500nx.

This active power applying method detects, especially, voltages output from the plurality of power converting apparatuses 500ax, 500bx, . . . , 500nx, and applies active power based on the detected voltages in order to stabilize a grid voltage.

FIG. 1B shows an example of detecting a voltage output from a power converting apparatus 500x according to a conventional active power applying method.

Referring to the drawing, the power converting apparatus 500x can include a converter 530x for converting a level of a DC voltage from a solar cell module, an inverter 540x for converting the DC voltage from the converter 530x into an AC voltage and outputting the AC voltage, a controller 550x for controlling the converter 530x and the inverter 540x via respective control signals Scc and Sic, and a current detector Fx for detecting a voltage output from the inverter 540x.

FIG. 1C shows an example of output voltage waveforms when active power is applied to the power converting apparatus 500x according to the conventional active power applying method.

FIG. 1C, (a) shows an active power waveform Pewx, and (b) shows an output voltage waveform Vacx.

Referring to the drawings, there is illustrated an example in which active power till time Tax is set as P1x, active power between the time Tax and a time Tbx is set as P2x higher than P1x, active power between the time Tbx and a time Tcx is set as a P3x lower than P1x, and active power between the time Tcx and a time Tdx is set as P1x.

In the case where active power is applied in this manner, a peak of the output voltage waveform Vacx till the point in time Tax can be Vp1c1x, a peak of the output voltage waveform Vacx between the time Tax and the time Tbx can be Vp1c2x higher than Vp1c1x, a peak of the output voltage waveform Vacx between the time Tbx and the time Tcx can be Vp1c3x lower than Vp1c1x, and a peak of the output voltage waveform Vacx between the time Tcx and the time Tdx can be Vp1c1x.

As such, when active power is applied, a grid voltage can be stabilized, but the output voltage waveform Vacx can have various peaks. In order to detect the peaks, high performance is required for the voltage detector Fx.

Meanwhile, FIG. 1D shows an example in which a maximum power point varies as active power is applied.

Referring to FIG. 1D, before active power is applied, the maximum power point can be mpp1 and the maximum power can be Pmpp1. Other maximum power points can be mpp2 and mpp3.

However, as shown in FIG. 1C, if active power of various levels is applied, a voltage level varies to Vmpp2, Vmpp3, or the like rather than Vmpp1, and hence the maximum power point varies as well. Thus, the maximum power can be Pmpp2, Pmpp3, or the like lower than Pmpp1.

Accordingly, when active power is applied, there is a problem that efficiency of the power converting apparatus 500x is reduced in accordance with Maximum Power Point Tracking (MPPT) control.

In the embodiments of the present invention, a reactive power applying method, not an active power applying method, is proposed in order to stabilize a grid voltage. In particular, there is proposed a method in which reactive power is applied not constantly but randomly in a predetermined period, thereby stabilizing a grid voltage and at the same time preventing degradation of efficiency of a power converting apparatus. A detailed description thereof will be provided with reference to FIG. 2A and other drawings.

Figure 2A:
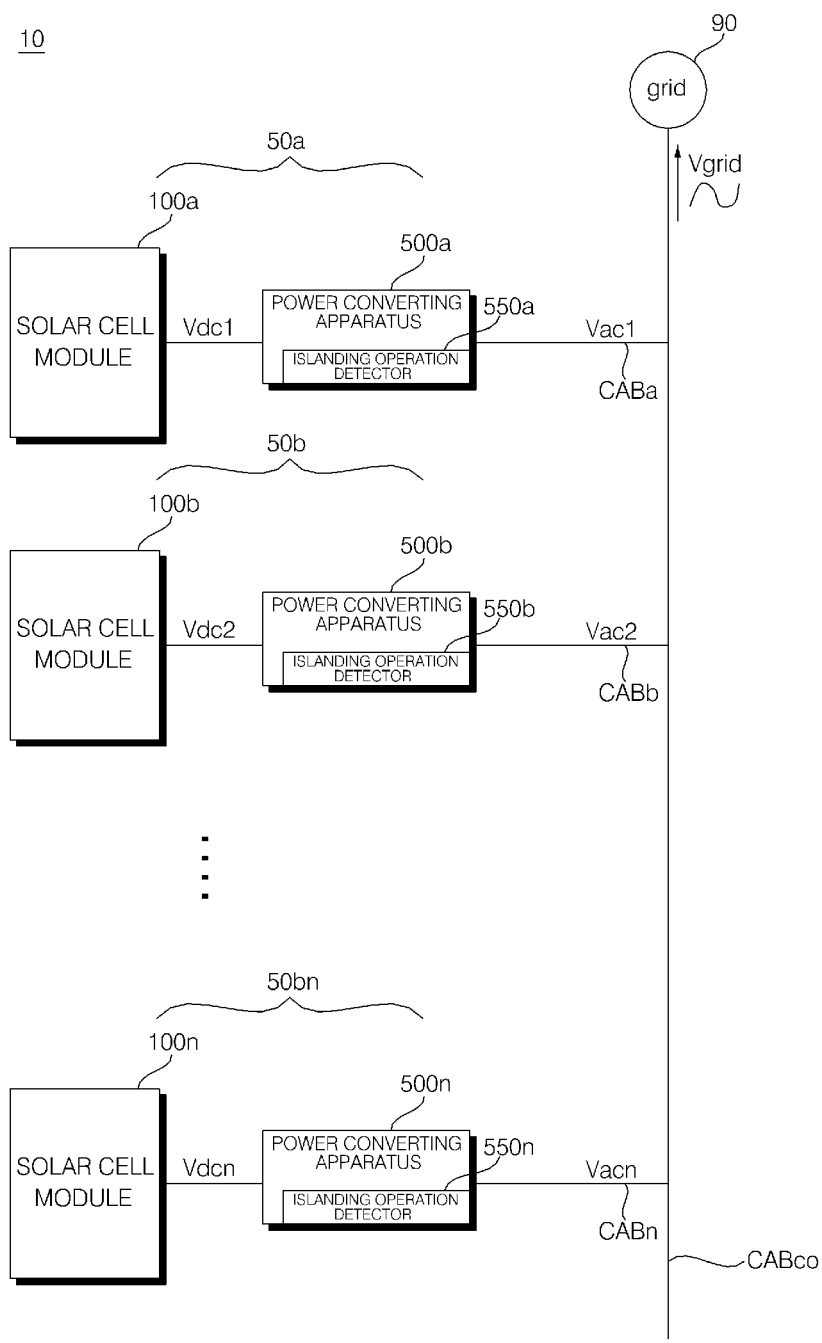
FIGS. 2A and 2B are diagrams showing various example of a photovoltaic system including a photovoltaic module according to an embodiment of the present invention.
Figure 2B:
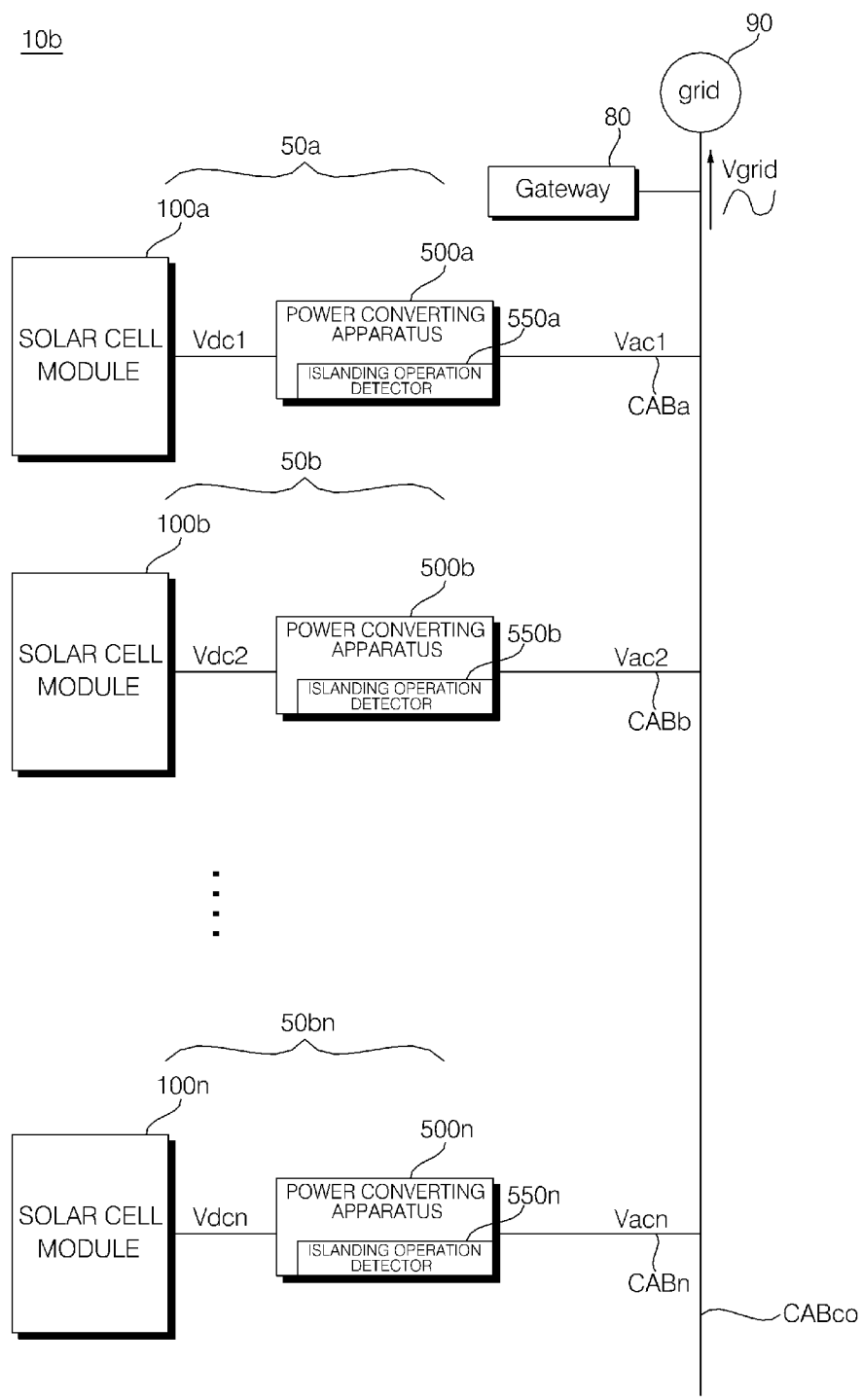
Figure 2C:
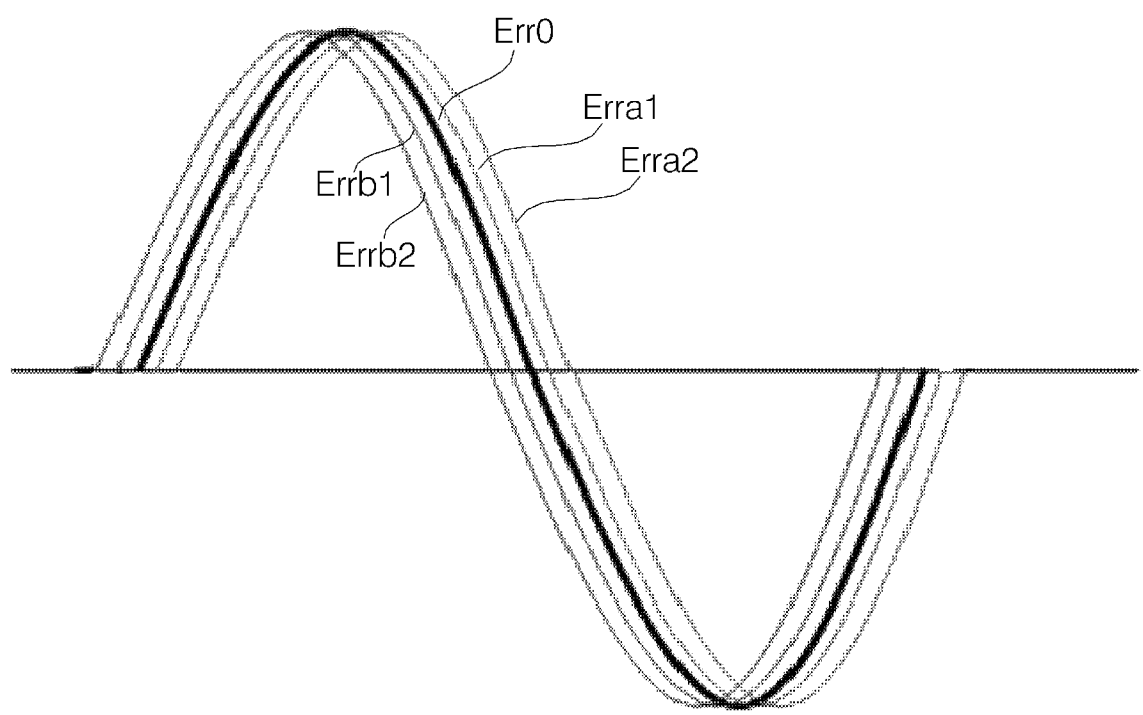
FIG. 2C is a diagram referred to in the description of FIG. 2A or 2B.

FIGS. 2A and 2B are diagrams showing various example of a photovoltaic system including a photovoltaic module according to an embodiment of the present invention, and FIG. 2C is a diagram referred to in the description of FIG. 2A or 2B. All the components of the photovoltaic system including the photovoltaic module according to all embodiments of the present invention are operatively coupled and configured.

First, referring to FIG. 2A, a photovoltaic system 10 according to an embodiment of the present invention can include a plurality of photovoltaic modules 50a, 50b, . . . , 50n.

Meanwhile, the plurality of photovoltaic modules 50a, 50b, . . . , 50n can be connected in parallel to each other, and AC voltages Vac1, Vac2, . . . , Vacn output respectively from the plurality of photovoltaic modules 50a, 50b, . . . , 50n can be supplied to a grid 90 via a cable CABco.

Meanwhile, the plurality of photovoltaic modules 50a, 50b, . . . , 50n can respectively include solar cell modules 100a, 100b, . . . , 100n outputting DC voltages Vdc1, Vdc2, . . . , Vdcn, and power converting apparatuses outputting AC voltages Vac1, Vac2, . . . , Vacn.

Meanwhile, the power converting apparatuses 500a, 500b, . . . , 500n can respectively include islanding operation detectors 550a, 550b, . . . , 550n to prevent islanding operation.

Meanwhile, the plurality of photovoltaic modules 50a, 50b, . . . , 50n in the photovoltaic system 10 shown in FIG. 2A can be a grid-connected photovoltaic module connected to the grid 90.

In particular, the plurality of power converting apparatuses 500a, 500b, . . . , 500n output AC voltages Vac1, Vac2, . . . , Vacn via cables CABa, CABb, . . . , CABn.

Meanwhile, in order to prevent islanding operation, grid condition information is received in a gateway to determine whether or not grid power is stopped, and, if the information is transmitted to the plurality of power converting apparatuses 500a, 500b, . . . , 500n, inverters in the plurality of power converting apparatuses 500a, 500b, . . . , 500n can stop operating based on the received information, thereby easily preventing islanding operation.

Meanwhile, the present invention aims to prevent islanding operation of the power converting apparatuses not using a gateway, but using algorithms in the islanding operation detectors 550a, 550b, . . . , 550n of the power converting apparatuses.

For example, in the case where an islanding operation state indicating that grid power is not present occurs when the plurality of power converting apparatuses 500a, 500b, . . . , 500n operates, if some of the power converting apparatuses operate, such power converting apparatuses in operation can be recognized as the grid and inverters in the power converting apparatuses in operation need not stop operating within a limited period.

Thus, allowing islanding operation of the plurality of power converting apparatuses 500a, 500b, . . . , 500n only for the limited period is important. That is, it is important to not allow islanding operation of the plurality of power converting apparatuses 500a, 500b, . . . , 500n after the limited period.

Accordingly, the plurality of power converting apparatuses 500a, 500b, . . . , 500n according to an embodiment of the present invention performs control to inject reactive power to output voltages during a first period, when inverters 540 operates. When a variation between a frequency of a grid voltage after the injection of the reactive power and a frequency of a grid voltage before of the injection of the reactive power is greater than or equal to a preset value, the plurality of power converting apparatuses 500a, 500b, . . . , 500n can perform control to turn off the inverters 540.

Accordingly, it is possible to output stable AC power to the grid. In particular, in the case where an unstable AC voltage is output due to addition of reactive power while there is no variation in output power, it is not possible to stop operating. That is, in the case where the plurality of power converting apparatuses 500a, 500b, . . . , 500n are connected in parallel with each other, it is possible to prevent islanding operation of each of the plurality of power converting apparatuses 500a, 500b, . . . , 500n. As a result, the grid can be stabilized.

In particular, the islanding operation detectors 550a, 550b, . . . , 550n according to an embodiment of the present invention can calculate a first frequency variation of an AC voltages output from an inverter, selectively inject reactive power based on the first frequency variation, and, when a second frequency variation of a grid voltage after the injection of the reactive power is greater than or equal to a preset value, perform control to turn off the inverters.

Meanwhile, the islanding operation detectors 550a, 550b, . . . , 550n according to an embodiment of the present invention can change a level of the injected reactive power based on the calculated first frequency variation.

Meanwhile, the islanding operation detectors 550a, 550b, . . . , 550n according to an embodiment of the present invention can change a level of the injected reactive power during a first period.

Meanwhile, the islanding operation detectors 550a, 550b, . . . , 550n can correspond to controllers of power converting apparatuses, which will be described later.

Meanwhile, the first period is randomly determined and it is preferable, but not required, that the first period does not overlap with a first period of an adjacent power converting apparatus.

In order to randomly determine the first period, the present invention can employ a PLL in a controller 550 implemented as a DSP that controls an output voltage of an inverter. The PLL is capable of detecting a phase of the output voltage and being driven by software.

Meanwhile, if a period of injecting reactive power is set based on a factional number of a PLL in consideration of the fact that a fractional number of each PLL is random, a variation of reactive power hardly likely to overlap with an output from another inverter is injected.

Accordingly, when reactive power is injected, the period for injecting reactive power does not overlap with the same of an adjacent power converting apparatus, and therefore, the grid can be stabilized.

Meanwhile, each of the plurality of power converting apparatuses 500a, 500b, . . . , 500n randomly injects reactive power. Accordingly, a maximum power point need not vary and thus degradation of efficiency of output power can be prevented.

Meanwhile, each of the plurality of power converting apparatuses 500a, 500b, . . . , 500n can calculate a first frequency variation corresponding to a difference between a frequency of a current output voltage and a frequency of a previous output voltage, and randomly inject reactive power based on the first frequency variation. In doing so, degradation of efficiency of output power can be prevented.

Meanwhile, each of the plurality of power converting apparatuses 500a, 500b, . . . , 500n can calculate a first frequency variation corresponding to a difference between a frequency of a current output voltage and a frequency of a previous output voltage, and, when the first frequency variation is less than or equal to a reference value, each of the plurality of power converting apparatuses 500a, 500b, . . . , 500n does not inject reactive power. In doing so, a stable AC voltage can be output to the grid.

Meanwhile, FIG. 2C is a diagram showing a first frequency variation corresponding to a difference between a frequency of a current output voltage and a frequency of a previous output voltage.

In FIG. 2C, Err0 can indicate the case where the frequency variation is 0, Erra1 can indicate the case where the first frequency variation is 1, Erra2 can indicate the case where the first frequency variation is 2, Errb1 can indicate the case where the first frequency variation is −1, and Errb2 can indicate the case where the first frequency variation is −2.

Accordingly, in the present invention, reactive power is not injected in the case of Err=0, like Err0.

Meanwhile, in the case of Err=1, which corresponds to Erra1, or in the case of Erra=2, which corresponds to Err>1, it is determined that a waveform of the frequency of the current output voltage leads by a waveform of the frequency of the previous output voltage, and thus, leading reactive power can be injected into an output voltage as a variation.

Meanwhile, in the case of Err=−1, which corresponds to Errb1, or in the case of Err<−1, which corresponds to Errb2, it is determined that the waveform of the frequency of the current output voltage lags by the waveform of the frequency of the previous output voltage, and thus, lagging reactive power can be injected into an output voltage as a variation.

Reactive power of a greater value can be injected as the first frequency variation is greater. The first frequency variation is calculated by a PLL of an inverter connected in parallel with other inverters, and a PLL of each inverter has a different fractional number and thus reactive power is randomly injected.

Meanwhile, after reactive power is randomly injected, each of the plurality of power converting apparatuses 500a, 500b, . . . , 500n compares a previous value and a current value of a grid voltage frequency. When a second frequency variation (Grid Err) corresponding to a difference between the previous value and the current value of the grid voltage frequency is greater than or equal to a preset value, each of the plurality of power converting apparatuses 500a, 500b, . . . , 500n determines an islanding operation state and performs control to turn off the inverter 540. In doing so, a stable AC power can be output to the grid.

To this end, when the second frequency variation is greater than or equal to the preset value, the count value is 1, and, when the second frequency variation is less than or equal to the preset value, the count number is 0 and it goes back to the first step and the above-described steps are performed again. If the first frequency variation becomes great, reactive power is injected again and a second frequency variation according thereto is detected. Then, if the second frequency variation is greater than or equal to a preset value, the count value is increased.

The above-described process is performed repeatedly in a predetermined period. If a counter value is greater than or equal to the preset value within the predetermined period, an islanding operation state is determined and hence the inverter is turned off.

Meanwhile, when the inverter 540 restarts after the turn-off state, the islanding operation detector 550 performs control to inject reactive power into an output voltage. In this manner, degradation of efficiency of output power can be prevented.

Meanwhile, when a variation between a frequency of a current grid voltage after the injection of the reactive power and a frequency of a previous grid voltage before the injection of the reactive power is less than a preset value, each of the plurality of power converting apparatuses 500a, 500b, . . . , 500n can determine that a grid power source is connected properly and hence output a stable AC voltage to the grid.

Meanwhile, each of the plurality of power converting apparatuses 500a, 500b, . . . , 500n can perform control to maintain output power at a constant level or within a predetermined range based on the constant level during a first period, when the inverter 540 operates. In doing so, degradation of efficiency of the output power can be prevented.

Meanwhile, each of the plurality of power converting apparatuses 500a, 500b, . . . , 500n can perform control to maintain output power at a constant level or within a predetermined range based on the constant level during a first period and a second period, when the inverter 540 operates. In doing so, efficiency degradation of the output power can be prevented.

Meanwhile, each of the plurality of power converting apparatuses 500a, 500b, . . . , 500n performs control to inject reactive power into an output voltage in async with an adjacent power converting apparatus 500, when the inverter 540 operates. When a variation between a frequency of a grid voltage after the injection of the reactive power and a frequency of a grid voltage before the injection of the reactive power is greater than or equal to a preset value, each of the plurality of power converting apparatuses 500a, 500b, . . . , 500n performs control to turn off the inverter 540. Accordingly, a stable AC voltage can be output to the grid. In particular, since reactive power not affecting active power is selectively injected, it is possible to stop operation of the inverter when an unstable voltage is output while there is no variation in active output power of the inverter. That is, islanding operation of a power converting apparatus 500 can be prevented. As a result, the grid can be stabilized.

Next, referring to FIG. 2B, a photovoltaic system 10b according to an embodiment of the present invention can include a plurality of photovoltaic modules 50a, 50b, . . . , 50n and a gateway 80.

The photovoltaic system 10b in FIG. 2B is similar to the photovoltaic system 10 in FIG. 2A, and difference therebetween will be primarily described in the following.

The gateway 80 can detect a voltage of the grid 90, and transmit information IVg on the grid voltage to a plurality of photovoltaic modules 50a, 50b, . . . , 50n, especially, power converting apparatuses 500a, 500b, . . . , 500n.

For example, in order to transmit the information IVg on the grid voltage, the gateway 80 and the power converting apparatuses 500a, 500b, . . . , 500n can perform power line communication.

For another example, in order to transmit the information IVg on the grid voltage, the gateway 80 and the power converting apparatuses 500a, 500b, . . . , 500n can perform wireless communication.

Figure 3:
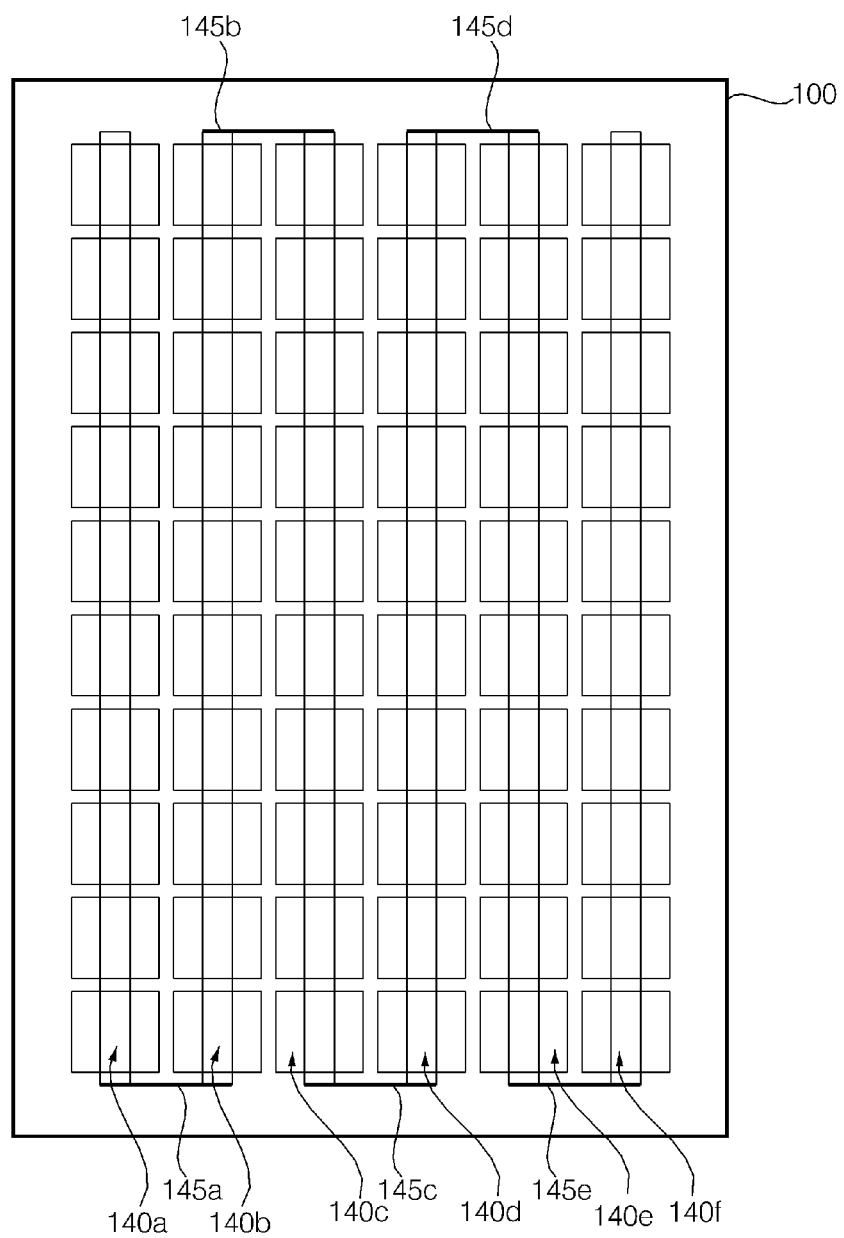
FIG. 3 is a front view of a photovoltaic module according to an embodiment of the present invention.
Figure 4:
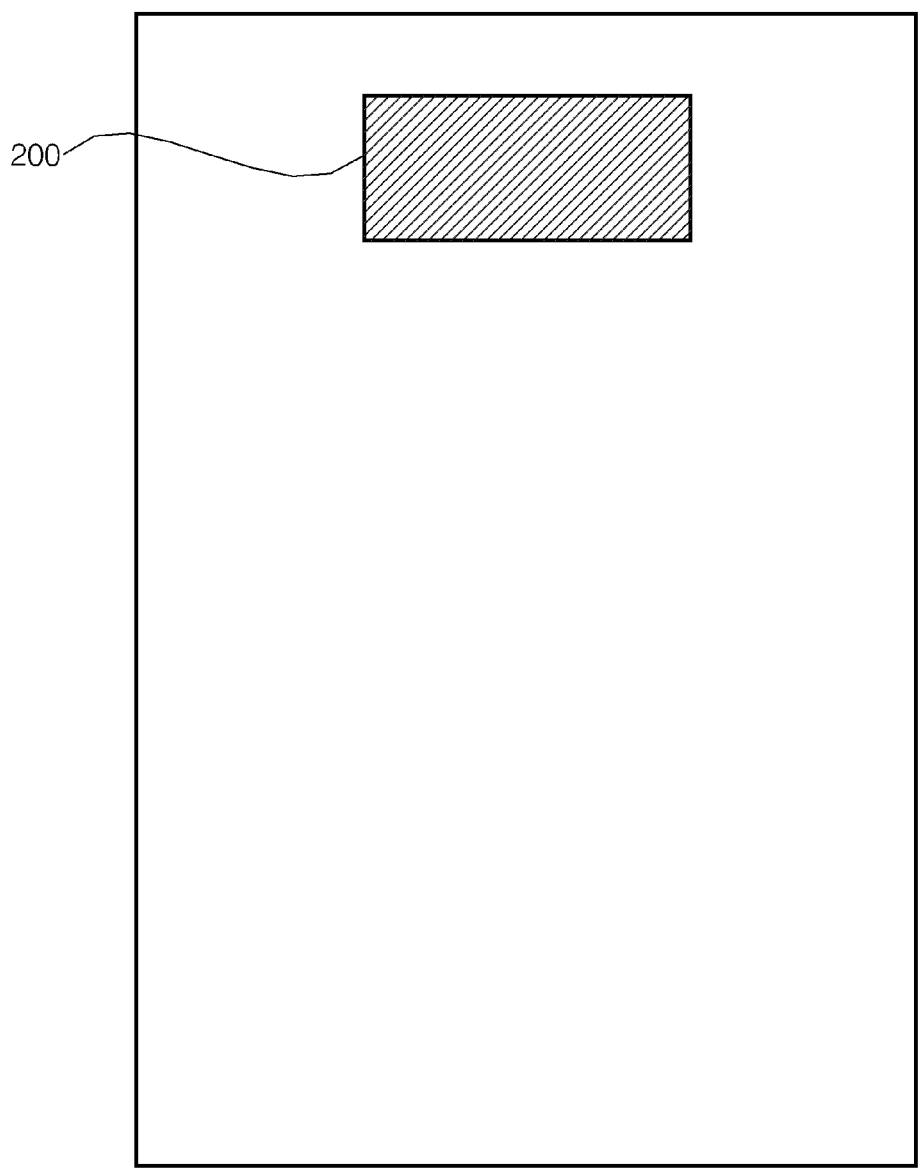
FIG. 4 is a rear view of the photovoltaic module shown in FIG. 3

FIG. 3 is a front view of a photovoltaic module according to an embodiment of the present invention, and FIG. 4 is a rear view of the photovoltaic module shown in FIG. 3.

Referring to FIG. 3, a photovoltaic module 50 according to an embodiment of the present invention can include a solar cell module 100, and a junction box 200 provided on the rear side of a solar cell module 100.

The junction box 200 can include a power converting apparatus 500 (see FIG. 5) to convert power.

Figure 5:
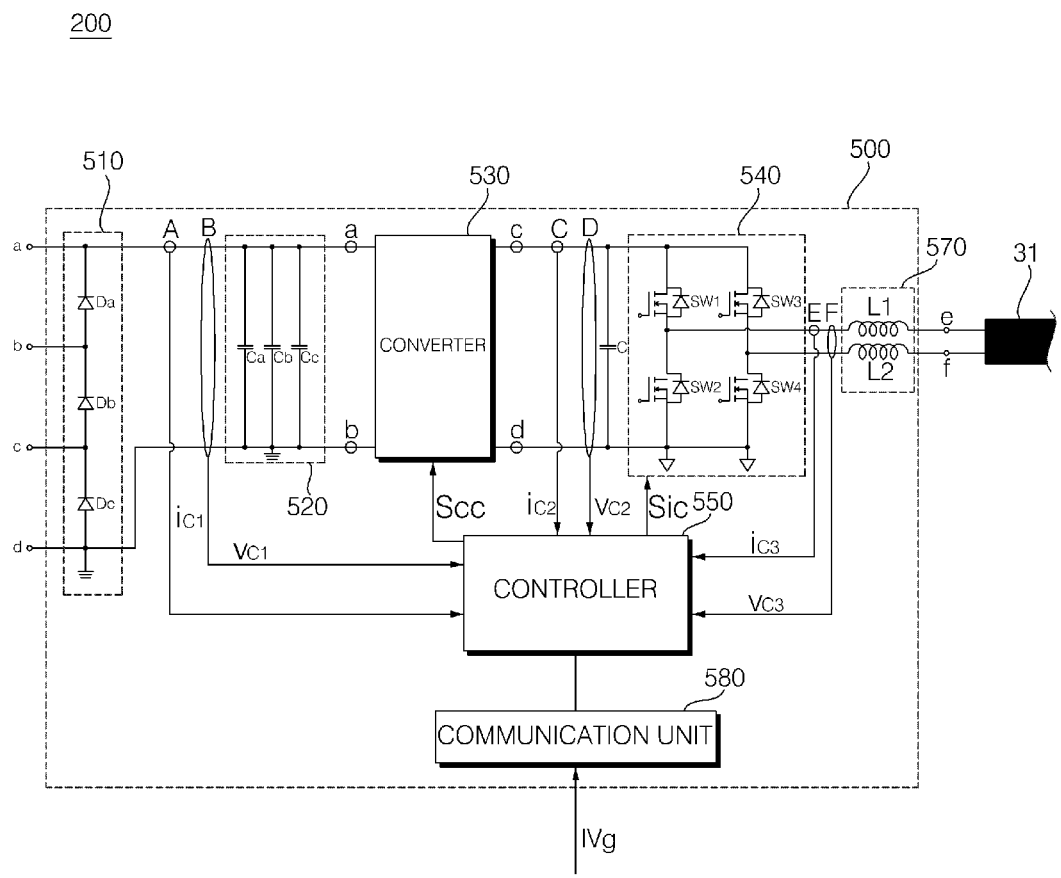
FIG. 5 is a diagram showing an internal circuit of a power converting apparatus in a photovoltaic module shown in FIG. 3.

FIG. 5 shows an example in which the power converting apparatus 500 (see FIG. 5) includes three bypass diodes Da, Db, and Dc (see FIG. 5) corresponding to four solar cell strings shown in FIG. 3.

The solar cell module 100 can include a plurality of solar cells.

The solar cells are connected in a line by means of a ribbon to form solar cell strings 140. In this manner, six strings 140a, 140b, 140c, 140d, 140e and 140f are formed and each string includes ten solar cells, for example. Arrangement of solar cells can be modified in various manners from that shown in the figure.

The solar cell strings can be electrically connected through bus ribbons. FIG. 3 shows that the first solar cell string 140a is electrically connected to the second solar cell string 140b, the third solar cell string 140c is electrically connected to the fourth solar cell string 140d, and the fifth solar cell string 140e is electrically connected to the sixth solar cell string 140f through bus ribbons 145a, 145c and 145e arranged at the lower part of the solar cell module 100, respectively.

In addition, FIG. 3 shows that the second solar cell string 140b is electrically connected to the third solar cell string 140c and the fourth solar cell string 140d is electrically connected to the fifth solar cell string 140e through bus ribbons 145b and 145d arranged at the upper part of the solar cell module 100, respectively.

The ribbon connected to the first solar cell string 140a, the bus ribbons 145b and 145d, and the ribbon connected to the fourth solar cell string 140d are respectively electrically connected to first to fourth conductive lines (not show), and the first to fourth conductive lines (not shown) can be connected to the bypass diodes (Da, Db and Dc in FIG. 4) in the junction box 200 provided on the rear side of the solar cell module 100 through an opening formed in the solar cell module 100.

Here, the opening formed in the solar cell module 100 can be formed to correspond to the region in which the junction box 200 is positioned.

FIG. 5 is a diagram showing an internal circuit of a power converting apparatus in a photovoltaic module shown in FIG. 3.

Referring to FIG. 5, a power converting apparatus 500 can be provided in the junction box 200 shown in FIG. 4.

The power converting apparatus 500 can convert DC power from the solar cell module 100 and output the converted power.

To this end, the power converting apparatus 500 can include a converter 530, an inverter 540, a controller 550 for controlling the converter 530 and the inverter 540, and a communication unit 580.

In addition, the power converting apparatus 500 can further include a bypass diode unit 510 for bypass, a capacitor unit 520 for storing DC power, and a filter 570 for filtering output AC power.

Meanwhile, the power converting apparatus 500 can further include an input current detector A, an input voltage detector B, a converter output current detector C, a converter output voltage detector D, an inverter output current detector E and an inverter output voltage detector F.

The controller 550 can control the converter 530 and the inverter 540 via respective control signals Scc and Sic.

The bypass diode unit 510 can include the bypass diodes Dc, Db and Da arranged between the first to fourth conductive lines of the solar cell module 100. Here, the number of bypass diodes is one or more, for example, less than the number of conductive lines by one.

The bypass diodes Dc, Db and Da receive photovoltaic DC power from the solar cell module 100, particularly, from the first to fourth conductive lines in the solar cell module 100. When a reverse voltage is generated in DC power from at least one of the first to fourth conductive lines, the bypass diodes Dc, Db and Da can bypass the DC power.

DC power which has passed through the bypass diode unit 510 can be input to the capacitor unit 520.

The capacitor unit 520 can store the DC power input through the solar cell module 100 and the bypass diode unit 510.

Although the figure shows that the capacitor unit 520 includes a plurality of capacitors Ca, Cb and Cc connected in parallel, a plurality of capacitors can be connected in series and parallel or connected in series to a ground terminal. Alternatively, the capacitor unit 520 can include only one capacitor.

The converter 530 can convert the level of an input voltage from the solar cell module 100, which has passed through the bypass diode unit 510 and the capacitor unit 520.

Particularly, the converter 530 can perform power conversion using DC power stored in the capacitor unit 520.

Switching elements in the converter 530 can be turned on/off based on a converter switching control signal from the controller 550. Accordingly, level-converted DC power can be output.

The inverter 540 can convert the DC power converted by the converter 530 into AC power. The figure shows a full-bridge inverter.

That is, upper arm switching elements SW1 and SW3 connected in series and lower arm switching elements SW2 and SW4 connected in series are paired, and the two pairs of upper and lower arm switching elements SW1, SW2, SW3 and SW4 are connected in parallel. A diode can be connected in anti-parallel with each switching element SW1 to SW4.

The switching elements SW1 to SW4 in the inverter 540 can be turned on/off based on an inverter switching control signal from the controller 550. Accordingly, AC power having a predetermined frequency can be output. Desirably, AC power having the same frequency (about 60 Hz or 50 Hz) as the AC frequency of the grid is output.

The capacitor C can be disposed between the converter 530 and the inverter 540.

The capacitor C can store the DC power having the level converted by the converter 530. Both terminals of the capacitor C can be called DC terminals and thus the capacitor C can be called a DC-terminal capacitor.

The input current detector A can detect input current ic1 supplied from the solar cell module 100 to the capacitor unit 520.

The input voltage detector B can detect an input voltage Vc1 supplied from the solar cell module 100 to the capacitor unit 520. Here, the input voltage Vc1 can be the same as the voltage stored in the capacitor unit 520.

The detected input current ic1 and input voltage vc1 can be input to the controller 550.

The converter output current detector C detects output current ic2 from the converter 530, that is, DC-terminal current, and the converter output voltage detector D detects an output voltage vc2 from the converter 530, that is, a DC-terminal voltage. The detected output current ic2 and output voltage vc2 can be input to the controller 550.

The inverter output current detector E detects current ic3 output from the inverter 540 and the inverter output voltage detector F detects a voltage vc3 output from the inverter 540. The detected current ic3 and voltage vc3 are input to the controller 550.

The controller 550 can output control signals for controlling the switching elements of the converter 530. Particularly, the controller 550 can output a turn-on timing signal of the switching elements included in the converter 530 based on at least one of the detected input current ic1, input voltage vc1, output current ic2, output voltage vc2, output current ic3 and output voltage vc3

Further, the controller 550 can output inverter control signals for controlling the switching elements SW1 to SW4 of the inverter 540. Particularly, the controller 550 can output a turn-on timing signal of the switching elements SW1 to SW4 of the inverter 540 based on at least one of the detected input current ic1, input voltage vc1, output current ic2, output voltage vc2, output current ic3 or output voltage vc3.

Further, the controller 550 can calculate a maximum power point with respect to the solar cell module 100 and control the converter 530 to output DC power corresponding to maximum power according thereto.

The filter 570 can be disposed at the output terminals of the inverter 540.

In addition, the filter 570 can include a plurality of passive elements L1 and L2 and adjust a phase difference between an AC current io and an AC voltage vo output from the inverter 540 based on at least some of the plurality of passive elements.

The first cable 31, which is connected to the grid cable CABc, can be electrically connected to the output terminals of the filter 570.

The communication unit 580 can communicate with the gateway 80 external thereto through power line communication, wireless communication, or the like.

In particular, the communication unit 580 can receive grid voltage-related information IVg from the gate way 80. The grid voltage-related information IVg can include a level, phase, frequency, and the like of the grid voltage.

Figure 6:
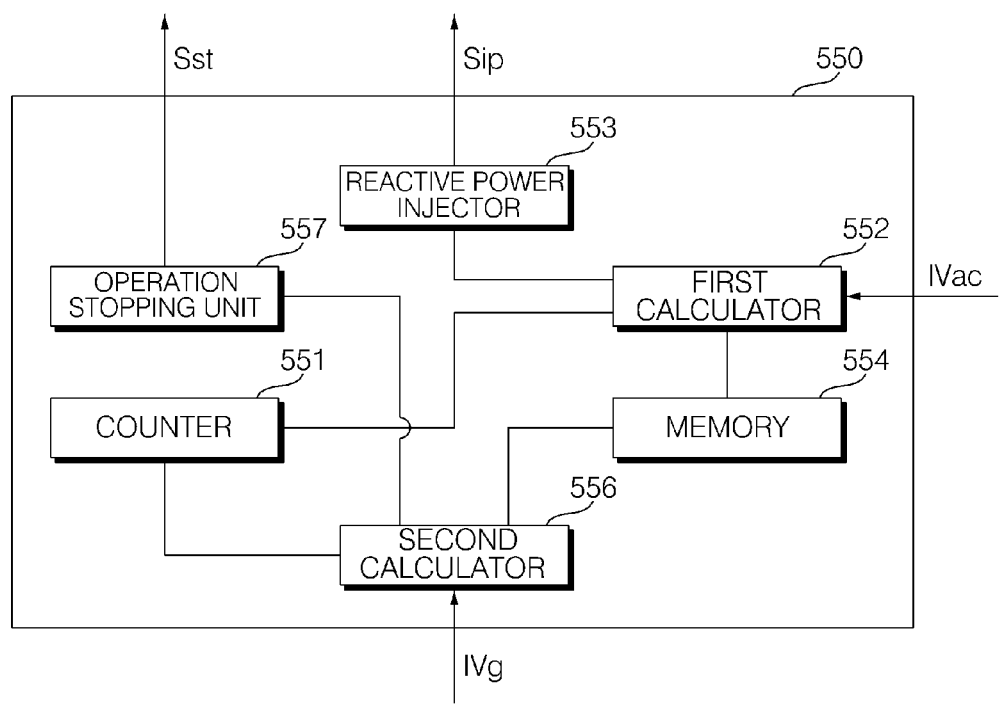
FIG. 6 is an example of an internal block diagram of the controller shown in FIG. 5.

FIG. 6 is an example of an internal block diagram of the controller shown in FIG. 5.

Referring to FIG. 6, the controller 550 can include a counter 551, a first calculator 552, a memory 554, a second calculator 556, a reactive power injector 553, and an operator stopping unit 557.

Here, the first calculator 552 can be referred to as a first frequency variation calculator 552, and the second calculator 556 can be referred to as a second frequency variation calculator 556.

The counter 551 can count a frequency during a first period of output voltage information IVac detected by an output voltage detector F. In general, a controller is configured as a Digital Signal Processor (DSP), and the DSP includes a Phase Locked Loop (PLL) that outputs a signal in sync with a reference input signal.

As an output from an inverter has to match a grid voltage, a frequency of the output voltage from the inverter which matches a frequency of the grid voltage is detected using the PLL. Based on information regarding the frequency, DC power received from a Pulse Width Modulation (PWM) device is generated into DC power having an amplitude and a phase matching with the frequency of the grid voltage and the AC power is output, but, in the present invention, a deviation of the information regarding the frequency is used to determine islanding operation.

The first calculator 552 can calculate a first frequency variation Err, which corresponds to a difference between a frequency of a current output voltage and a frequency of a previous output voltage, based on a frequency calculated by the PLL. The frequency of the previous output voltage can be a value stored in the memory 554.

The reactive power injector 553 can output a control signal Sip so as to inject reactive power based on the first frequency variation corresponding to the difference between the frequency of the current output voltage and the frequency of the previous output voltage.

In particular, the reactive power injector 553 can randomly inject reactive power based on the first frequency variation corresponding to the difference between the frequency of the current output voltage and the frequency of the previous output voltage.

For example, the reactive power injector 553 can perform control such that magnitude of reactive power to be injected increases or a period of injecting reactive power increases as the first frequency variation increases.

Meanwhile, the reactive power injector 553 can inject reactive power only when the first frequency variation corresponding to the difference between the frequency of the current output voltage and the frequency of the previous output voltage exceeds a reference value.

That is, when the first frequency variation corresponding to the difference between the frequency of the current output voltage and the frequency of the previous output voltage is less than or equal to the reference value, the reactive power injector 553 need not inject reactive power.

The memory 554 can store the frequency of the previous output voltage. In addition, the memory 554 can store a frequency of a grid voltage before injection of reactive power.

After injection of reactive power, the second calculator 556 can calculate a second frequency variation corresponding to difference between a frequency of a grid voltage after the injection of reactive power and a frequency of a grid voltage before the injection of reactive power.

Here, the frequency of the grid voltage before the injection of reactive power can be a value stored in the memory 554.

Meanwhile, when the second frequency variation calculated by the second calculator 556 is greater than or equal to a preset value, the operation stopping unit 557 can output an operation stop signal Sst to turn off the inverter 540. Accordingly, the inverter 540 is turned off, stopping operation.

Figure 7:
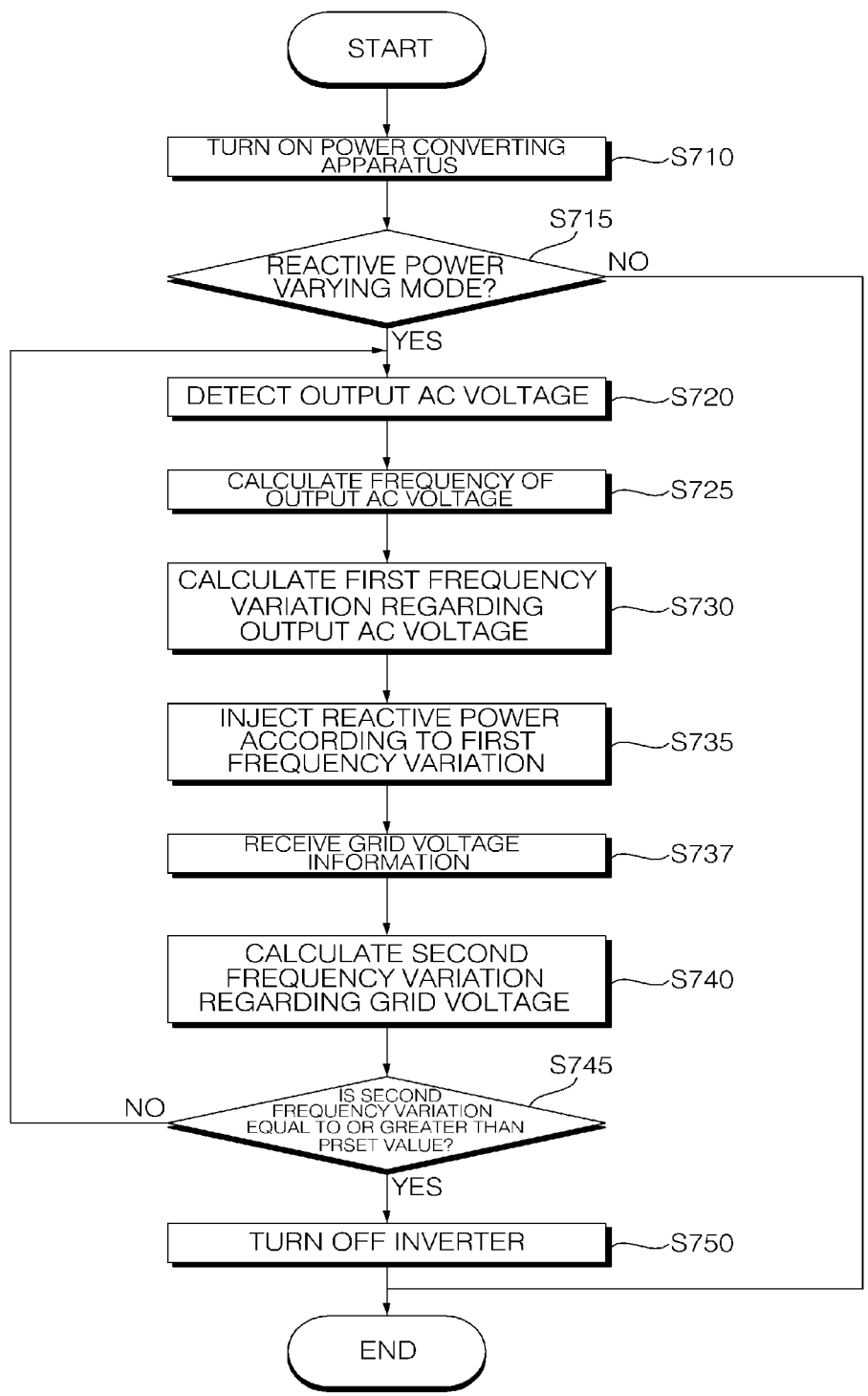
FIG. 7 is a flowchart showing an operation method of a power converting apparatus according to an embodiment of the present invention.
Figure 8:
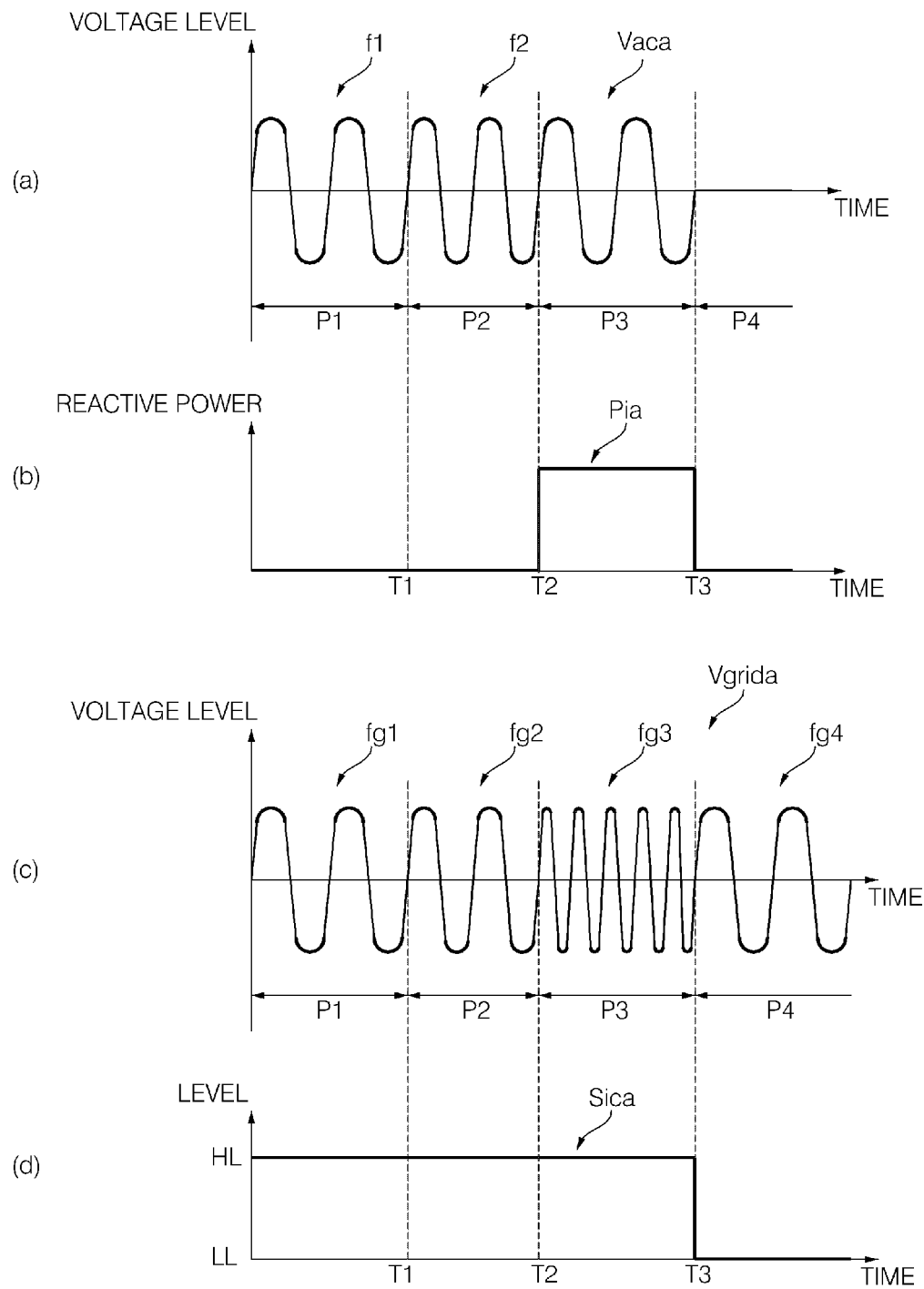
FIGS. 8 to 10 are diagrams referred to in the description about the operation method shown in FIG. 7.
Figure 9:
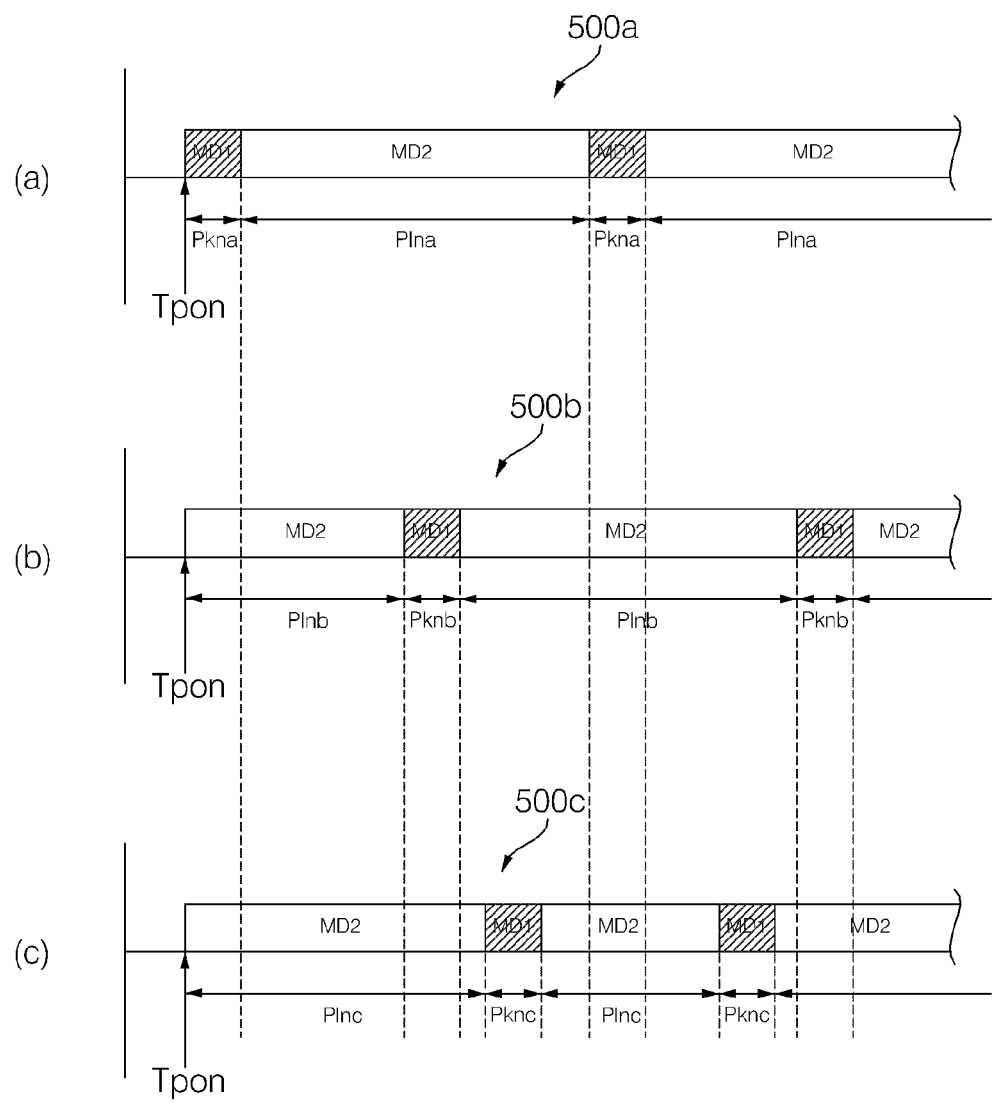
Figure 10:
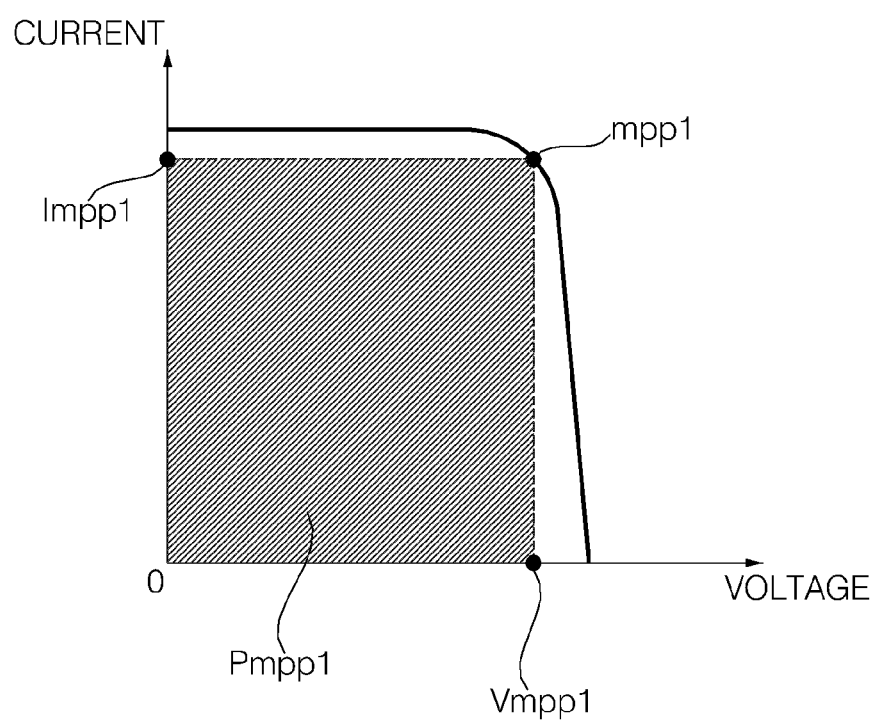

FIG. 7 is a flowchart showing an operation method of a power converting apparatus according to an embodiment of the present invention, and FIGS. 8 to 10 are diagrams referred to in the description about the operation method shown in FIG. 7.

Referring to FIG. 7, the operation of a power converting apparatus 500 is turned on (S710).

The controller 550 can output a control signal Sic to an inverter 540 or the like, and the inverter 540 or the like operates to turn on operation of the power converting apparatus 500.

Next, in order to prevent islanding operation of the power converting apparatus 500, the controller 550 can perform control to inject reactive power randomly by each inverter.

In FIG. 9, (a) shows an example in which, after a power-on time Tpon, a reactive power varying mode MD1 is implemented in a first power converting apparatus 500a during a first period Pkna.

The reactive power varying mode MD1 is implemented temporarily, and, after the reactive power varying mode MD1 is terminated, a power generation mode MD2 for outputting an output AD voltage to a grid without injecting reactive power can be implemented during a second period Plna.

Meanwhile, in FIG. 9, (b) shows an example in which the power generation mode MD2 for outputting an output AD voltage without injecting reactive power is implemented in a second power converting apparatus 500b after the power-on time Tpon, and then the reactive power varying mode MD1 is implemented during the first period Pknb.

Meanwhile, in FIG. 9, (c) shows an example in which, after the power-on time Tpon, the power generation mode MD2 for outputting an output AC voltage to a grid without injection of reactive power is implemented in a third power converting apparatus 500c during a second period Plnc, and then the reactive power varying mode MD1 is implemented during the first period Pknc.

Meanwhile, it is preferable, but not required, that a first period in which the reactive power varying mode is implemented does not overlap among the plurality of power converting apparatuses 500a to 500c.

That is, each of the power converting apparatuses 500a to 500c can inject reactive power to an output voltage during the first period in async with any of adjacent power converting apparatuses.

Meanwhile, the controller 550 can control a switching unit of an inverter that controls operating or stopping the inverter depending on whether islanding operation is detected.

Meanwhile, the controller 550 determines whether a reactive power varying mode is turned on (S715). If the reactive power varying mode is turned on, the controller 550 receives Information IVac on an output voltage detected by the output voltage detector F (S720) and calculate a frequency of an output AC voltage (S725).

Then, the controller 550, especially the first calculator 552, calculates a first frequency variation corresponding to a difference between a frequency of a current output voltage and a frequency of a previous output voltage (S730).

Then, the controller 550, especially the reactive power injector 553, injects reactive power depending on the first frequency variation (S735).

The reactive power injected by the controller 550, especially the reactive power injector 553, is preferably different from reactive power injected by an adjacent power converting apparatus. In doing so, a grid voltage can be stabilized.

Then, the controller 550 can receive grid voltage-related information IVg from the communication unit 580 (S737).

Then, the controller 550, especially the second calculator 556, calculates a second frequency variation corresponding a difference between a frequency of a grid voltage after the injection of the reactive power and a frequency of a grid voltage before the injection of the reactive power (S740).

Then, when the second frequency variation is greater than or equal to a preset value and especially when the second frequency variation is calculated a predetermined number of times or more to be greater than or equal to the preset value (S745), the controller 550, especially the operation stopping unit 557, performs control to turn off the inverter 540 (S750). In particular, an operation stop signal Sst can be output.

In order to determine an islanding operation state caused by power cut, not by a temporary variation, if the number of periods in which a reference value or higher is counted is greater than or equal to a preset value within a preset period of time, islanding operation can be determined and accordingly an inverter is stopped. In the present embodiment, the corresponding operation is performed repeatedly for 10 periods, and, if three or more abnormal periods in which the reference value or higher is counted are detected, islanding operation is determined, and, if not, a normal operation is determined.

Meanwhile, when the inverter 540 restarts after an off state, the controller 550 can perform control to inject reactive power into an output voltage.

In this case, as shown in (a) of FIG. 9, after the power-on time Tpon, a reactive power varying mode MD1 can be implemented again in the first power converting apparatus 500a during a first period Pkna.

The controller 550 can perform frequency detection to detect a grid frequency, and selectively inject reactive power according to a variation in the detected frequency. If the variation in the grid frequency after the injection of reactive power is less than or equal to a preset value, the controller 550 continues normal operation of the inverter. If the variation in the grid frequency after injection of reactive power is greater than the preset value, the controller 550 can determine an islanding operation state and stop operation of the inverter such that the inverter is disconnected from the grid.

The detection of the frequency can be performed by tracking a grid frequency through a PLL of the power converting apparatus 500.

An output from the inverter is provided in the form of a sinusoidal waveform having the same phase and frequency as those of the grid and in sync with the grid. To this end, a PLL is used to detect phase information of the grid.

Thus, based on a variation in a grid frequency detected by the PLL, whether there is an error in the grid frequency is determined primarily. A frequency variation Err in the grid frequency can be calculated from a difference between a previous grid frequency and a current grid frequency, and, if the frequency variation is greater than or equal to a preset value, it is controlled such that reactive power is injected to an output voltage of the inverter.

In this case, the process of calculating a frequency variation based on a phase angle detected by the PLL can be performed independently by individual PLLs of inverters connected in parallel to one another, as shown in the present invention.

In this case, a fractional number of a PLL is calculated differently by each inverter and thus the same fractional number is hardly likely to be obtained. That is, the respective inverters connected in parallel to one another are hardly likely to obtain the same value of Err, and thus each inverter injects independent and async reactive power. Accordingly, reactive power applied to the inverters connected in parallel can be offset by one another, thereby eliminating a possibility of a failure of detecting islanding operation.

Meanwhile, if there is no frequency variation (Err=0), a normal state be determined and thus reactive power is not injected. If there is a frequency variation, reactive power is injected so as to determine whether islanding operation has occurred. In this case, an amount of leading reactive power or lagging reactive power to inject is determined based on the frequency variation.

For example, if Err=1, a first amount of leading reactive power is injected; if Err>1, a second leading reactive power is injected; if Err=−1, a first amount of lagging reactive power is injected; and, if Err<−1, a second amount of reactive power is injected. In this case, the greater the variation is, the more the reactive power is injected.

Meanwhile, in the case where the grid is connected, the power converting apparatus is controlled by a grid frequency of a grid power source and hence there is no variation in the grid frequency even when reactive power corresponding to an insignificant amount of variation is applied from the outside. However, if reactive power is injected when grid power is not present, a greater frequency variation can be detected by a PLL. Accordingly, a variation Grid Err in a grid frequency is calculated after injection of reactive power, and whether islanding operation has occurred can be determined based on the variation Grid Err.

Meanwhile, islanding operation is not determined right after the detected variation Grid Err in the grid frequency is calculated to be greater than or equal to a reference value. Instead, islanding operation is determined when the detected variation Grid Err in the grid frequency is calculated repeatedly in a predetermined period to be greater than or equal to a reference value.

To this end, if the variation Grid Err calculated after injection of reactive power is greater than or equal to the reference value, the variation is counted and the process goes back to the grid frequency detecting step to repeatedly determine whether islanding operation has occurred.

In the case where grid power is not present, if the PLL operation is performed repeatedly, a frequency difference compared to the grid voltage frequency after primary injection of reactive power can becomes greater. Then, a value of Err is increased and thus greater reactive power is injected, and therefore, a frequency variation after the secondary injection of the reactive power can become greater than or equal to a reference value again. However, in the case of a temporary frequency variation, a grid signal can become stabilized again and the value of Err is reduced, and therefore, the frequency variation can become less than or equal to the reference value.

In order to determine an islanding operation state caused by power cut, not by a temporary variation, if the number of periods in which a reference value or higher is counted is greater than or equal to a preset value within a preset period of time, islanding operation can be determined and accordingly an inverter is stopped. In the present embodiment, the corresponding operation is performed repeatedly for 10 periods, and, if three or more abnormal periods in which the reference value or higher is counted are detected, an islanding operation state is determined, and, if not, normal operation is determined.

Meanwhile, the present invention is applied to a distributed power device in which a plurality of inverters is connected in parallel with a grid, and, in this case, the first period of a power converting apparatus 500 does not overlap with the same of another power converting apparatus 500 connected in parallel thereto.

In FIG. 8, (a) shows an example of an output voltage waveform Vaca of a voltage output from the power converting apparatus 500, In, FIG. 8, (b) shows an example of a reactive power waveform Pia of reactive power applied to a power converting apparatus 500, In FIG. 8, (c) shows an example of a grid voltage waveform Vgrida of a grid voltage, and In FIG. 8, (d) shows an example of a switching control signal waveform Sica of a switching control signal applied to an inverter 540 in the power converting apparatus 500.

The output voltage waveform Vaca in (a) of FIG. 8 shows an example in which a frequency of the output voltage waveform Vaca in a period P1 and a period P2 are a first frequency f1 and a second frequency f2 higher than a first frequency f1, respectively.

The power converting apparatus 500 varies a level, frequency or the like of the output voltage waveform from time to time according to an amount of power generated by a solar cell module 100, especially according to a DC voltage.

Accordingly, a controller 550 calculate a difference in the frequency of the output voltage waveform between the period P1 and the period P2.

Meanwhile, if a first frequency variation corresponding to a difference between a frequency of a current output voltage and a frequency of a previous output voltage exceeds a reference value, the controller 550 can enter a reactive power varying mode for a period P3 between a time T2 and a time T3 to inject reactive power.

The drawings show an example in which reactive power of a level Pm is injected. In embodiments, the reactive power can be injected during the entire period P3 or during a portion of the period P3.

Meanwhile, reactive power to be injected can be determined randomly.

Then, after reactive power is injected randomly or in other words after the time T2, the controller 550 can calculate a second frequency variation corresponding to a difference between a frequency of a grid voltage after the injection of the reactive power and a frequency of a grid voltage before the injection of the reactive power.

In FIG. 8, (c) shows an example in which a frequency of a grid voltage in the period P2 is fg2 and a frequency of a grid voltage in the period P3 is fg3.

In particular, it is found that, after reactive power is injected, the frequency of the grid voltage f3 has increased significantly, compared to the frequency of the grid voltage f2 for the period P2.

It is because that the frequency of the grid voltage is affected by a voltage waveform of the power converting apparatus 500 due to injection of reactive power.

Thus, when the second frequency variation corresponding to a difference between a frequency of a grid voltage after injection of reactive power and a frequency of a grid voltage before the injection of the reactive power is greater than or equal to a reference value and when the second frequency variation is calculated a predetermined number of times or more to be greater than or equal to the reference value, the controller 550 can perform control to turn off operation of the corresponding power converting apparatus 500 for grid stabilization. In particular, it can be controlled such that the inverter 540 is turned off.

Accordingly, the controller 550 can output an operation stop signal Sst to the inverter 540.

In FIG. 8, (d) shows an example in which a level of an inverter switching control signal Sic is maintained at a T high level HL till T1, T2, and T3 and then maintained at a low level LL from T3.

Accordingly, the operation of the inverter 540 stops from T3. Therefore, as shown in (a) of FIG. 8, an output voltage waveform Vaca is maintained at level 0 from T3.

Accordingly, it is possible to temporarily stop unstable operation of the power converting apparatus 500, thereby stabilizing the grid.

Meanwhile, a reactive power applying method described with reference to FIGS. 7 to 9 is different from the reactive power applying method described in FIG. 1D, and thus, despite application of reactive power, power output from a power converting apparatus is maintained at a constant level or within a predetermined range based on the constant level.

In particular, when the inverter 540 operates, output power can be maintained at a constant level or within a predetermined range based on the constant level during a first period in which reactive power is injected. To this end, the controller 550 can perform control to maintain output power at a constant level or within a predetermined range based on the constant level during the first period, when the inverter 540 operates.

Meanwhile, after reactive power is injected, the controller 550 terminates injecting reactive power if a variation between a frequency of a grid voltage after the injection of the reactive power and a frequency of a grid voltage before the injection of the reactive power is less than a reference value, and the controller 550 performs control to output, during a second period, an AC voltage to which the reactive power is not injected.

In this case, the controller 550 can perform control to maintain output power at a constant level or within a predetermined range based on the constant level during the first period and the second period, when the inverter 540 operates.

FIG. 10 is a diagram referred to in the description of the case where the maximum power point is at a constant level or within a predetermined range based on the constant level even before and after reactive power is injected.

Referring to FIG. 10, the maximum power point can be mpp1 not only before but also after the injection of the reactive power, and the maximum power can be expressed as Pmpp1.

That is, a voltage corresponding to the maximum power point not only before but also after the injection of the reactive power can be maintained constantly at Vmpp1, and a current corresponding to the maximum power point can be maintained constantly at Impp1.

Therefore, despite the application of the reactive power, efficiency of the power converting apparatus 500 operating according to Maximum Power Point Tracking (MPPT) control is not reduced but maintained, thereby stabilizing the grid.

The power converting apparatus, the photovoltaic module, and the photovoltaic system including the same according to the present invention are not limited to configurations and method of the above-described embodiments, but the entirety or a portion of the exemplary embodiments can be selectively combined to be configured into various modifications.

While the present invention has been particularly shown and described with reference to exemplary embodiments thereof, it is clearly understood that the same is by way of illustration and example only and is not to be taken in conjunction with the present invention. It will be understood by those skilled in the art that various changes in form and details can be made therein without departing from the subject matter and scope of the present invention.

What is claimed is:

1. A power converting apparatus for converting direct current (DC) power into alternating current (AC) power and outputting the AC power, the apparatus comprising:
    an inverter configured to convert the DC power input from a solar cell module or a converter into the AC power and output the AC power to a grid; and
    an islanding operation detector configured to calculate a first frequency variation of the AC power output from the inverter, selectively inject reactive power of the solar cell module based on the first frequency variation, and perform control to turn off the inverter based on whether a second frequency variation of a grid voltage of the grid after the injection of the reactive power of the solar cell module is greater than or equal to a preset value,
    where the islanding operation detector is configured to:
    calculate the first frequency variation corresponding to a difference between a frequency of a current output voltage and a frequency of a previous output voltage; and
    not inject the reactive power based on whether the first frequency variation is less than or equal to a reference value.

2. The power converting apparatus of claim 1, wherein the islanding operation detector is further configured to change a level of the injected reactive power based on the first frequency variation.

3. The power converting apparatus of claim 1, wherein the islanding operation detector is further configured to change a level of the injected reactive power during a first period of the inverter.

4. The power converting apparatus of claim 3, wherein the first period of the inverter is determined randomly.

5. The power converting apparatus of claim 3, wherein the first period of the inverter does not overlap with a first period of an adjacent power converting apparatus.

6. The power converting apparatus of claim 3, wherein the islanding operation detector is configured to perform control to terminate injecting the reactive power and to output, during a second period, an AC voltage of which the reactive power is not injected based on whether a second frequency variation corresponding to a difference between a frequency of a grid voltage after the injection of the reactive power and a frequency of a grid voltage before the injection of the reactive power is less than the preset value.

7. The power converting apparatus of claim 6, wherein the islanding operation detector is configured to perform control to maintain output power at a constant level or within a predetermined range based on the constant level during the first period and the second period based on whether the inverter operates.

8. The power converting apparatus of claim 3, wherein the islanding operation detector is configured to perform control to maintain output power at a constant level or within a predetermined range based on the constant level during the first period based on whether the inverter operates.

9. The power converting apparatus of claim 1, wherein the islanding operation detector is further configured to randomly inject the reactive power of the solar cell module.

10. The power converting apparatus of claim 1, wherein the injected reactive power of the solar cell module is different from a reactive power injected by an adjacent power converting apparatus.

11. The power converting apparatus of claim 1, wherein the islanding operation detector is further configured to:
    randomly inject the reactive power of the solar cell module based on the first frequency variation.

12. The power converting apparatus of claim 1, wherein the islanding operation detector is further configured to perform control to turn off the inverter based on whether a second frequency variation corresponding to a difference between a frequency of a grid voltage after the injection of the reactive power and a frequency of a grid voltage before the injection of the reactive power is greater than or equal to the preset value.

13. The power converting apparatus of claim 1, wherein the islanding operation detector is configured to perform control to inject the reactive power into the output voltage based on whether the inverter restarts after a turn-off state.

14. The power converting apparatus of claim 1, further comprising:

a converter configured to convert a level of the DC power input from the solar cell module and output the DC power with the converted level; and a voltage detector configured to detect a voltage output from the inverter.

15. The power converting apparatus of claim 1, further comprising a communication unit configured to receive grid voltage information of the grid.

16. A power converting apparatus for converting direct current (DC) power into alternating current (AC) power and outputting the AC power, the apparatus comprising:

an inverter configured to convert the DC power input from a solar cell module or a converter into the AC power and output the AC power to a grid; and an islanding operation detector configured to calculate a first frequency variation of the AC power output from the inverter, selectively inject reactive power of the solar cell module based on the first frequency variation, and perform control to turn off the inverter based on whether a second frequency variation of a grid voltage of the grid after the injection of the reactive power of the solar cell module is greater than or equal to a preset value, wherein the islanding operation detector is further configured to perform control to turn off the inverter based on whether a second frequency variation corresponding to a difference between a frequency of a grid voltage after the injection of the reactive power and a frequency of a grid voltage before the injection of the reactive power is greater than or equal to the preset value, and whether the second frequency variation is calculated a predetermined number of times or more to be greater than or equal to the preset value.

17. A photovoltaic module comprising:

a power converting apparatus for converting direct current (DC) power into alternating current (AC) power and outputting the AC power, wherein the power converting apparatus comprises:

an inverter configured to convert the DC power input from a solar cell module or a converter into the AC power and output the AC power to a grid; and an islanding operation detector configured to calculate a first frequency variation of the AC power output from the inverter, selectively inject reactive power of the solar cell module based on the first frequency variation, and perform control to turn off the inverter based on whether a second frequency variation of a grid voltage of the grid after the injection of the reactive power of the solar cell module is greater than or equal to a preset value, wherein the islanding operation detector is configured to:

calculate the first frequency variation corresponding to a difference between a frequency of a current output voltage and a frequency of a previous output voltage; and not inject the reactive power based on whether the first frequency variation is less than or equal to a reference value.

18. A photovoltaic system comprising:

a plurality of photovoltaic modules connected in parallel with one another and configured to output an alternating current (AC) voltage to a grid, wherein the photovoltaic module includes a power converting apparatus, and wherein the power converting apparatus comprises:

an inverter configured to convert DC power input from one solar cell module of the plurality of solar cell modules or a converter into AC power and output the AC power to the grid; and an islanding operation detector configured to calculate a first frequency variation of the AC power output from the inverter, selectively inject reactive power of the one solar cell module based on the first frequency variation, and perform control to turn off the inverter based on whether a second frequency variation of a grid voltage of the grid after the injection of the reactive power of the one solar cell module is greater than or equal to a preset value, wherein the islanding operation detector is configured to:

calculate the first frequency variation corresponding to a difference between a frequency of a current output voltage and a frequency of a previous output voltage; and not inject the reactive power based on whether the first frequency variation is less than or equal to a reference value.

19. The photovoltaic system of claim 18, further comprising a gateway configured to transmit information regarding the grid voltage of the grid to the power converting apparatus.

* * * * *